(12) United States Patent
Alexander et al.

(10) Patent No.: US 8,102,799 B2
(45) Date of Patent: Jan. 24, 2012

(54) CENTRALIZED WIRELESS NETWORK FOR MULTI-ROOM LARGE PROPERTIES

(75) Inventors: Arnon Alexander, Marietta, GA (US); Jan C. Bakke, Leksvik (NO); Jan Elfstrom, Landskrona (SE); Martin Kjallman, Helsingborg (SE); Paul Zimmerman, Las Vegas, NV (US)

(73) Assignee: Assa Abloy Hospitality, Inc., Richardson, TX (US)

( * ) Notice: Subject to any disclaimer, the term of this patent is extended or adjusted under 35 U.S.C. 154(b) by 1036 days.

(21) Appl. No.: 11/872,549

(22) Filed: Oct. 15, 2007

(65) Prior Publication Data
US 2008/0089277 A1 Apr. 17, 2008

Related U.S. Application Data

(60) Provisional application No. 60/829,661, filed on Oct. 16, 2006.

(51) Int. Cl.
*H04W 4/00* (2009.01)
(52) U.S. Cl. ......... 370/328; 370/255; 370/401; 370/408
(58) Field of Classification Search .................. 370/254, 370/255, 328, 331, 401, 408; 348/154; 455/446; 705/13; 709/223
See application file for complete search history.

(56) References Cited

U.S. PATENT DOCUMENTS

| | | | |
|---|---|---|---|
| 4,235,101 A | 11/1980 | Stadelmann | |
| 4,338,493 A | 7/1982 | Stenhuis et al. | |
| 4,497,031 A | 1/1985 | Froehling et al. | |
| 4,557,072 A | 12/1985 | Rittmeister et al. | |
| 4,850,040 A | 7/1989 | Teich et al. | |
| D327,642 S | 7/1992 | Foubister | |
| 5,128,792 A | 7/1992 | Teich et al. | |
| D330,507 S | 10/1992 | Foubister | |
| 5,153,560 A | 10/1992 | Ichikawa | |
| D331,409 S | 12/1992 | Goldsmith et al. | |
| 5,321,963 A | 6/1994 | Goldman et al. | |
| 5,344,068 A | 9/1994 | Haessig | |
| 5,395,042 A | 3/1995 | Riley et al. | |
| 5,544,809 A | 8/1996 | Keating et al. | |
| 5,591,950 A | 1/1997 | Imedio-Ocana | |
| 5,610,489 A | 3/1997 | Hart et al. | |
| 5,620,137 A | 4/1997 | Coelho et al. | |
| 5,628,777 A | 5/1997 | Moberg et al. | |

(Continued)

FOREIGN PATENT DOCUMENTS
CA 2606067 4/2008
(Continued)

OTHER PUBLICATIONS

Extreme Sensors, "Sensor Networks Make Early Inroads" retrieved from Internet site http://www.extremesensors.com/print_article/Sensor+Networks+Make+Early+Inroads/1411... on Sep. 6, 2006, 6 pages.

(Continued)

*Primary Examiner* — Hassan Kizou
*Assistant Examiner* — Toan Nguyen
(74) *Attorney, Agent, or Firm* — Sheridan Ross P.C.

(57) ABSTRACT

Method and devices for use in a centralized wireless network are provided. The centralized wireless network employs a wireless communication protocol to communicate with various devices throughout the network. In addition to communication, the protocol may be used to control and monitor various aspects of the devices throughout the network.

19 Claims, 21 Drawing Sheets

U.S. PATENT DOCUMENTS

| | | | |
|---|---|---|---|
| 5,636,264 A | 6/1997 | Sulavuori et al. | |
| 5,709,134 A | 1/1998 | Ulm | |
| 5,733,188 A | 3/1998 | Jacob | |
| 5,909,378 A | 6/1999 | De Milleville | |
| 5,934,554 A | 8/1999 | Charles et al. | |
| 6,026,303 A * | 2/2000 | Minamisawa | 455/446 |
| 6,031,825 A | 2/2000 | Kaikuranta et al. | |
| 6,141,595 A | 10/2000 | Gloudeman et al. | |
| 6,160,881 A | 12/2000 | Beyda et al. | |
| 6,185,483 B1 | 2/2001 | Drees | |
| 6,194,997 B1 | 2/2001 | Buchner et al. | |
| 6,226,515 B1 | 5/2001 | Pauli et al. | |
| 6,290,140 B1 | 9/2001 | Pesko et al. | |
| 6,400,961 B1 | 6/2002 | Lillie et al. | |
| 6,442,211 B1 | 8/2002 | Hampel et al. | |
| 6,478,084 B1 | 11/2002 | Kumar et al. | |
| 6,486,778 B2 | 11/2002 | Mahler et al. | |
| 6,536,675 B1 | 3/2003 | Pesko et al. | |
| 6,549,643 B1 | 4/2003 | Toklu et al. | |
| 6,578,888 B1 | 6/2003 | Fayngersh et al. | |
| 6,580,354 B1 | 6/2003 | Schweiger et al. | |
| 6,657,316 B1 | 12/2003 | Smith et al. | |
| 6,664,710 B1 | 12/2003 | Gottlieb et al. | |
| 6,668,058 B2 | 12/2003 | Grimes | |
| D484,883 S | 1/2004 | Metivier et al. | |
| 6,685,257 B1 | 2/2004 | Beland et al. | |
| 6,734,648 B2 | 5/2004 | Fukumura et al. | |
| 6,772,049 B2 | 8/2004 | Choi | |
| 6,825,662 B2 | 11/2004 | Nistler et al. | |
| 6,825,761 B2 | 11/2004 | Christ et al. | |
| 6,828,755 B1 | 12/2004 | Iverson et al. | |
| 6,832,072 B2 | 12/2004 | Buckingham et al. | |
| 6,851,067 B2 | 2/2005 | Indefrey et al. | |
| 6,870,340 B2 | 3/2005 | Fukumura et al. | |
| 6,883,420 B2 | 4/2005 | Kuttalek | |
| 6,883,515 B2 | 4/2005 | Kuttalek | |
| 6,895,791 B2 | 5/2005 | Alexander et al. | |
| 6,904,905 B2 | 6/2005 | Kuttalek | |
| 6,907,300 B2 | 6/2005 | O'Mahoney et al. | |
| D512,297 S | 12/2005 | Metivier et al. | |
| D512,898 S | 12/2005 | Metivier et al. | |
| 6,975,202 B1 | 12/2005 | Rodriguez et al. | |
| 6,975,212 B2 | 12/2005 | Crenshaw et al. | |
| 7,007,985 B2 | 3/2006 | Alexander et al. | |
| D520,848 S | 5/2006 | Metivier et al. | |
| 7,043,063 B1 | 5/2006 | Noble et al. | |
| 7,053,757 B2 | 5/2006 | Buckingham et al. | |
| 7,058,477 B1 | 6/2006 | Rosen | |
| 7,061,393 B2 | 6/2006 | Buckingham et al. | |
| D526,556 S | 8/2006 | Metivier et al. | |
| 7,091,831 B2 | 8/2006 | Crenshaw et al. | |
| 7,123,139 B2 | 10/2006 | Sweeney | |
| 7,127,369 B2 | 10/2006 | Fukumura et al. | |
| D532,421 S | 11/2006 | Metivier et al. | |
| 7,149,503 B2 | 12/2006 | Aarnio et al. | |
| 7,170,395 B2 | 1/2007 | Crenshaw et al. | |
| 7,216,032 B2 | 5/2007 | Graf et al. | |
| 7,236,572 B2 | 6/2007 | Maschke | |
| 7,245,938 B2 | 7/2007 | Sobczak et al. | |
| 7,248,718 B2 | 7/2007 | Comaniciu et al. | |
| 7,304,406 B2 | 12/2007 | Behringer | |
| 7,317,970 B2 | 1/2008 | Pienta et al. | |
| 7,319,280 B1 | 1/2008 | Landry et al. | |
| 7,333,003 B1 | 2/2008 | Landry et al. | |
| 7,337,409 B2 | 2/2008 | Doblmayr et al. | |
| 7,356,086 B1 | 4/2008 | Landry et al. | |
| D569,279 S | 5/2008 | Krebs et al. | |
| 7,380,210 B2 | 5/2008 | Lontka et al. | |
| 7,391,224 B2 | 6/2008 | Wild | |
| RE40,492 E | 9/2008 | Grimes et al. | |
| 7,444,201 B2 | 10/2008 | Dirnfeldner | |
| 7,466,841 B2 | 12/2008 | Bahlmann et al. | |
| 7,515,033 B2 | 4/2009 | Roosli et al. | |
| 7,519,378 B2 | 4/2009 | Goertz et al. | |
| 7,519,379 B2 | 4/2009 | Goertz et al. | |
| 7,528,704 B2 | 5/2009 | Das et al. | |
| 7,558,402 B2 | 7/2009 | Zhou et al. | |
| 7,639,841 B2 | 12/2009 | Zhu et al. | |
| 7,643,908 B2 | 1/2010 | Quirino et al. | |
| 7,664,840 B2 * | 2/2010 | O'Neal et al. | 709/223 |
| 2002/0053969 A1 | 5/2002 | Wagner et al. | |
| 2002/0131374 A1 | 9/2002 | Lee | |
| 2003/0087678 A1 | 5/2003 | Smith et al. | |
| 2003/0149576 A1 | 8/2003 | Sunyich | |
| 2003/0194350 A1 | 10/2003 | Stamatelos et al. | |
| 2004/0022334 A1 | 2/2004 | Roosli et al. | |
| 2004/0059815 A1 | 3/2004 | Buckingham et al. | |
| 2004/0083128 A1 | 4/2004 | Buckingham et al. | |
| 2004/0178889 A1 | 9/2004 | Buckingham et al. | |
| 2004/0192423 A1 | 9/2004 | Nevermann | |
| 2004/0215723 A1 | 10/2004 | Chadha | |
| 2004/0227623 A1 | 11/2004 | Pozsgay | |
| 2004/0233928 A1 | 11/2004 | Pozsgay | |
| 2004/0242202 A1 | 12/2004 | Torvinen | |
| 2004/0246256 A1 | 12/2004 | Parakkuth et al. | |
| 2004/0260611 A1 | 12/2004 | Raz et al. | |
| 2004/0260612 A1 | 12/2004 | Raz et al. | |
| 2005/0029867 A1 | 2/2005 | Wood | |
| 2005/0095984 A1 | 5/2005 | Buckingham et al. | |
| 2005/0108417 A1 | 5/2005 | Haumont | |
| 2005/0120727 A1 | 6/2005 | Flinner et al. | |
| 2005/0135379 A1 | 6/2005 | Callaway, Jr. et al. | |
| 2005/0193932 A1 | 9/2005 | Denison et al. | |
| 2005/0198179 A1 | 9/2005 | Savilampi | |
| 2005/0206725 A1 | 9/2005 | Buckingham et al. | |
| 2005/0242970 A1 | 11/2005 | Blaker et al. | |
| 2005/0248441 A1 | 11/2005 | Crenshaw et al. | |
| 2005/0253690 A1 | 11/2005 | Crenshaw et al. | |
| 2005/0266798 A1 | 12/2005 | Moloney et al. | |
| 2005/0285445 A1 | 12/2005 | Wruck et al. | |
| 2006/0017547 A1 | 1/2006 | Buckingham et al. | |
| 2006/0019637 A1 | 1/2006 | Becker et al. | |
| 2006/0063523 A1 | 3/2006 | McFarland | |
| 2006/0064477 A1 | 3/2006 | Renkis | |
| 2006/0100002 A1 | 5/2006 | Luebke et al. | |
| 2006/0106499 A1 | 5/2006 | Roosli et al. | |
| 2006/0124541 A1 | 6/2006 | Logan et al. | |
| 2006/0132301 A1 | 6/2006 | Stilp | |
| 2006/0158344 A1 | 7/2006 | Bambini et al. | |
| 2006/0164205 A1 | 7/2006 | Buckingham et al. | |
| 2006/0164206 A1 | 7/2006 | Buckingham et al. | |
| 2006/0193310 A1 | 8/2006 | Landry et al. | |
| 2006/0193313 A1 | 8/2006 | Landry et al. | |
| 2006/0193336 A1 | 8/2006 | Landry et al. | |
| 2006/0215581 A1 * | 9/2006 | Castagnoli | 370/254 |
| 2007/0050240 A1 * | 3/2007 | Belani et al. | 705/13 |
| 2007/0057810 A1 | 3/2007 | Bos et al. | |
| 2007/0097993 A1 * | 5/2007 | Bojahra et al. | 370/401 |
| 2007/0103550 A1 * | 5/2007 | Frank et al. | 348/154 |
| 2007/0206537 A1 * | 9/2007 | Cam-Winget et al. | 370/331 |
| 2007/0223596 A1 | 9/2007 | Fan | |
| 2007/0233323 A1 | 10/2007 | Wiemeye et al. | |
| 2007/0239374 A1 | 10/2007 | Dougherty et al. | |
| 2008/0074059 A1 | 3/2008 | Ahmed | |
| 2008/0076346 A1 | 3/2008 | Ahmed | |
| 2008/0083234 A1 | 4/2008 | Krebs et al. | |
| 2008/0083834 A1 | 4/2008 | Krebs et al. | |
| 2008/0099570 A1 | 5/2008 | Krebs et al. | |
| 2008/0175210 A1 | 7/2008 | Jamieson | |
| 2008/0283621 A1 | 11/2008 | Quirino et al. | |
| 2009/0001069 A1 | 1/2009 | Bally et al. | |
| 2009/0032010 A1 | 2/2009 | Hoffmeier | |
| 2009/0040038 A1 | 2/2009 | Huber | |
| 2009/0055561 A1 | 2/2009 | Ritz et al. | |
| 2009/0096623 A1 | 4/2009 | Roosli | |

FOREIGN PATENT DOCUMENTS

| | | |
|---|---|---|
| CN | 1426073 | 11/2001 |
| CN | 101056262 | 10/2007 |
| DE | 4435812 | 2/1996 |
| DE | 10033754 | 1/2002 |
| DE | 10163012 | 7/2003 |
| DE | 20220204 | 4/2004 |
| DE | 202004004351 | 6/2004 |
| DE | 20122249 | 12/2004 |
| DE | 102004013623 | 10/2005 |
| DE | 102004020822 | 10/2005 |

| | | |
|---|---|---|
| DE | 44358123 | 2/2006 |
| EP | 0625767 | 11/1994 |
| EP | 0824043 | 2/1998 |
| EP | 1111635 | 6/2001 |
| EP | 1129653 | 9/2001 |
| EP | 1343011 | 9/2003 |
| EP | 1439495 | 7/2004 |
| EP | 1439498 | 7/2004 |
| EP | 1480399 | 11/2004 |
| EP | 1545053 | 6/2005 |
| EP | 1644600 | 4/2006 |
| EP | 1835661 | 9/2007 |
| EP | 1956450 | 8/2008 |
| EP | 1993065 | 11/2008 |
| GB | 521419 | 5/1940 |
| GB | 623650 | 5/1949 |
| GB | 1214690 | 12/1967 |
| GB | 1243410 | 8/1968 |
| GB | 2339838 | 2/2000 |
| KR | 100736546 | 6/2007 |
| WO | WO9013954 | 11/1990 |
| WO | WO9107011 | 5/1991 |
| WO | WO 92/06455 | 4/1992 |
| WO | WO 95/03086 | 2/1995 |
| WO | WO 95/22725 | 8/1995 |
| WO | WO 98/12880 | 3/1998 |
| WO | WO 98/26592 | 6/1998 |
| WO | 0021053 | 4/2000 |
| WO | WO 00/38205 | 6/2000 |
| WO | WO 00/43329 | 7/2000 |
| WO | WO 02/07387 | 1/2002 |
| WO | WO 02/060111 A2 | 8/2002 |
| WO | WO 02/065673 | 8/2002 |
| WO | WO02059764 | 8/2002 |
| WO | WO02060111 | 8/2002 |
| WO | WO 03/006279 | 1/2003 |
| WO | WO 03/023936 | 3/2003 |
| WO | WO03024077 | 3/2003 |
| WO | WO 03/096261 | 11/2003 |
| WO | WO 03/096292 | 11/2003 |
| WO | WO03105356 | 12/2003 |
| WO | WO 2004/010399 | 1/2004 |
| WO | WO 2004/017621 | 2/2004 |
| WO | WO 2004/028981 | 4/2004 |
| WO | WO 2004/043033 | 5/2004 |
| WO | WO 2004/057851 | 7/2004 |
| WO | WO 2004/066218 | 8/2004 |
| WO | WO 2004/081875 | 9/2004 |
| WO | WO 2004/086675 | 10/2004 |
| WO | WO 2004/102983 | 11/2004 |
| WO | WO 2004/109554 | 12/2004 |
| WO | WO 2004/110083 | 12/2004 |
| WO | WO 2004/114049 | 12/2004 |
| WO | WO2005004420 | 1/2005 |
| WO | WO 2005/073742 | 8/2005 |
| WO | WO 2005/079517 | 9/2005 |
| WO | WO 2005/081189 | 9/2005 |
| WO | WO2005079536 | 9/2005 |
| WO | WO2005079539 | 9/2005 |
| WO | WO2005081561 | 9/2005 |
| WO | WO 2005/109668 | 11/2005 |
| WO | WO 2005/109669 | 11/2005 |
| WO | WO 2006/009973 | 1/2006 |
| WO | WO 2006/018369 | 2/2006 |
| WO | WO 2006/020125 | 2/2006 |
| WO | WO2006015473 A1 | 2/2006 |
| WO | WO 2006/021592 | 3/2006 |
| WO | WO 2006/022910 | 3/2006 |
| WO | WO 2006/067271 | 6/2006 |
| WO | WO 2006/072617 | 7/2006 |
| WO | WO 2006/093771 | 9/2006 |
| WO | WO 2006/093772 | 9/2006 |
| WO | WO 2006/093773 | 9/2006 |
| WO | WO 2006/101614 | 9/2006 |
| WO | WO 2006/101615 | 9/2006 |
| WO | WO 2008/019942 | 2/2008 |
| WO | WO 2008/024306 | 2/2008 |
| WO | WO 2008/024985 | 2/2008 |
| WO | WO 2008/025007 | 2/2008 |
| WO | WO 2008/027830 | 3/2008 |
| WO | WO 2008/046365 | 4/2008 |
| WO | WO 2008/052178 | 5/2008 |
| WO | WO 2008/115184 | 9/2008 |
| WO | WO 2008/121181 | 10/2008 |
| WO | WO 2008/144488 | 11/2008 |
| WO | WO 2009/018215 | 2/2009 |

OTHER PUBLICATIONS

Ember Corporation, "Easy ZigBee on track with Telegesis and Ember" Feb. 1, 2006, 3 pages.

International Preliminary Report on Patentability for International (PCT) Application No. PCT/US07/081406, issued Apr. 22, 2009.

International Search Report and Written Opinion for International (PCT) Application No. PCT/US07/81406, dated Apr. 4, 2008.

Extended European Search Report for European Patent Application No. 07854055, dated Nov. 9, 2010.

* cited by examiner

CENTRALIZED WIRELESS NETWORK FOR MULTI-ROOM LARGE PROPERTIES

CROSS REFERENCE TO RELATED APPLICATIONS

This Application claims the benefit of U.S. Provisional Application No. 60/829,661, filed Oct. 16, 2006, the entire disclosure of which is hereby incorporated herein by reference.

FIELD OF THE INVENTION

The present invention relates generally to facility control systems, devices, and methods. More specifically, the present invention provides a centralized wireless network to control and monitor a large number of low powered devices throughout a large facility.

BACKGROUND

Multi-room or multi-suite facilities such as hotels, apartment buildings, office complexes, dormitories, office buildings, classrooms, cruise ships and laboratory facilities, and similar structures have many devices that, if monitored and/or controlled in a manner not currently done, will generate new functionalities in the areas of facility security, facility operational efficiency, and facility maintenance for the facility operator and will generate an overall cost reduction in facility management and maintenance.

In a hotel room, for example, individual rooms utilize devices/elements such as doors, electronic locks, Do Not Disturb (DND) devices, lights, heating, ventilation, and air conditioning (HVAC), safe, minibar, draperies, maid communication devices, room occupancy detection and communication, and more and all have a potentially high impact on the hotel operation and guest comfort. Should these devices/elements and/or the functionality associated with them connect online and communicate in relative real-time to the appropriate facility management department or monitoring system, many hours of labor can be saved, immediate response to possible threats or safety concerns can be executed, and service levels may be significantly enhanced. Prior systems have attempted to address solutions to some of the above concerns; however, these prior implementations are limited in performance and expensive.

Another challenge is the fact that some devices, especially locks, are mounted in a way that is not accessible by direct physical wiring. Such devices that cannot be directly accessed by wire typically require battery operation or a similar type of resident power source. Battery operation is expensive over time, particularly for a large facility. As a result, an efficient way to communicate with those devices is desirable.

Solutions for communicating with devices such as those that cannot be accessed by wires have predominately been addressed through combinations of wired connections, Infrared (IR) communication, or a specific, highly localized, RF communication method that is limited on an individual room-by-room basis. One such example is a network that provides communication capabilities with each individual room via dedicated wires, Cable TV, spare telephone wires or a LAN that is physically wired to each individual room. An in-room hub handles the communication to and from the devices in the room via wires where possible, or via IR. As an example, U.S. Pat. No. 7,061,393, the entire contents of which are incorporated herein by reference, describes a system and method for managing a multi-unit building with the combination of IR and wired sensors in a room. Each room is then connected to a floor LAN, which is ultimately connected to management servers and systems.

The challenges facing implementation of a system that addresses the foregoing problems and shortcomings are that most facilities already exist and are operational. This ultimately means that a wired communication network is already in place and the implementation of another communication network would require the installation of a new wired network. The process of pulling wire is difficult, very expensive and usually requires the rotation of a number of rooms off line making them unusable for an extended period of time, which for retrofit impacts facility revenue.

One problem with implementing IR as a part of a wireless communication protocol is that the IR waves cannot penetrate walls or be used to communicate between rooms. In fact, it can be difficult to communicate in the same room around corners. In most instances, IR requires a direct unimpeded line of site between devices that are communicating. If these shortcomings are acceptable, dedicated, closed IR solutions can be implemented with a proprietary protocol, but such solutions are not very energy efficient due to the fact that all devices must be run continuously rather than intermittently. These solutions require an in-room hub and Gateway (GW) to communicate to a central server. In addition, installation of known existing systems requires persons of high skill and technical knowledge, resulting in high installation and on-going maintenance costs.

SUMMARY

In accordance with embodiments of the present invention, an on-line wireless system connected to a wired system is provided. The wireless system may employ a unique adaptation of a known communication protocol utilizing a set of specifications for wireless personal area networking (WPAN). The communication protocol may be characterized by a relatively low data transmission rate, as compared to other wireless communication protocols such as Wireless Fidelity (Wi-Fi) and Bluetooth. Since the communication protocol utilizes a relatively low data transmission rate, devices implementing the communication protocol consume very little power and are thus characterized by long battery life. One example of such a communication protocol characterized by a low data transmission rate is the ZigBee standard protocol. ZigBee wireless network devices may be adapted to use the ZigBee protocol thereby providing control and the ability to monitor battery-powered devices in a multi-room facility. Embodiments of the present invention overcome the obstacles of installation complexity, the high cost of wiring, and the high cost and complexity of on-going maintenance usually associated with Infrared (IR) communication or localized in-room hubs by allowing all devices (regardless if they are low powered battery operated devices) in an area defined and/or covered by Radio Frequency (RF) transmissions to communicate directly with network routers or gateways or between themselves within the same RF transmission area. Transmission areas may overlap thereby allowing one wireless transmission area to communicate with another transmission area, which in turn allows one wireless device to communicate with a number of other devices. The system also introduces very low material costs that make the system applicable to many other commercial applications.

In accordance with embodiments of the present invention, the communication protocol may operate one or more channels in a number of different frequency bands. For example, the communication protocol may operate a number of communication channels in one or more of the 2.4 GHz band, the 915 MHz, and/or the 868 MHz. The data transmission rate may vary depending upon the frequency band employed. For instance, a data rate of 250 kbit/s per channel may be used in the 2.4 GHz band, a data rate of 40 kbit/s per channel may be utilized in the 915 MHz band, and a data rate of 20 kbit/s per channel may be used in the 868 MHz band. It should be appreciated that these bands and frequencies are exemplary and are not intended to limited or exclude other channels and/or frequencies.

The wireless network may be employed in conjunction with a wired network that can facilitate higher data transfer rates. The wireless network, in one embodiment, may comprise a ZigBee communication network, whereas the wired network may comprise an IP network such as a LAN or the Internet. The wireless network may utilize a predetermined architecture where it attempts to minimize/optimize each transmission path such that less noise is introduced and wireless transmissions can maintain their integrity. In one embodiment, if a message is transmitted wirelessly and some or the entire message is lost, the wireless device that should have received the message may request that the transmitting device transmit the message again. Therefore, the sending wireless device may be required to maintain a certain number of previously sent messages in a portion of memory, preferably buffer type memory, such that if it is requested that a message is resent, the sending wireless device can quickly access the message from memory and retransmit the message to the intended recipient.

It is typically very important to ensure that all transmitted messages or control signals are received at their final destination. To accommodate such a need, a central server may be employed to monitor the communications between various wireless devices. The central server may determine if a message is missing from a set of messages by analyzing the received messages and determining if there is some logical error in the messages that were received and the order in which they were received. Of course, the messages may be time stamped to facilitate easier analysis and therefore the messages do not necessarily need to arrive in the order in which they were transmitted. However, if a message is never received, then the central server may request that the message be transmitted again. The central server may also be responsible for reassembling the messages and determining what actions should be taken to manage the system as a whole.

The Summary is neither intended nor should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the drawings.

DETAILED DESCRIPTION

Embodiments of the present invention are directed toward devices and methods of using such devices in a wireless network. Although well suited for use in systems and methods employing RF communication protocols, such as the ZigBee protocol, embodiments of the present invention may be suitable for use in systems employing other low power consumption communication protocols including, without limitation, wireless USB, Z-Wave, and variations of the ZigBee protocol known and not yet developed.

Figure 1:
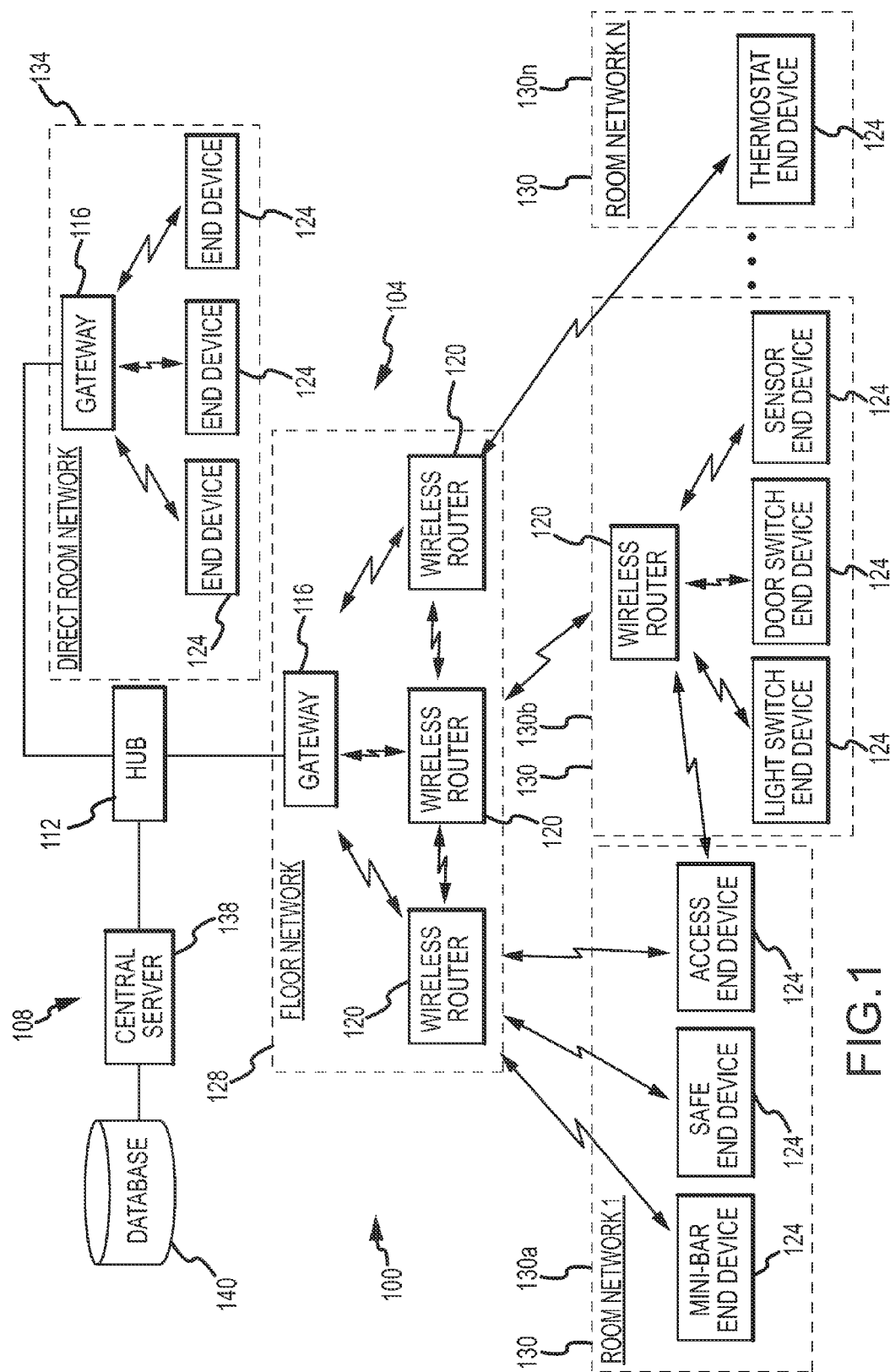
FIG. 1 is a block diagram depicting a management network in accordance with embodiments of the present invention.

FIG. 1 depicts a management system 100 in accordance with at least some embodiments of the present invention. The management system 100 generally comprises a wireless network 104 and a wired network 108. The management system 100, in one embodiment, is a centralized control and monitoring network capable of managing a multi-room facility. In accordance with embodiments of the present invention, the wireless network 104 interfaces with the wired network 108 through a hub 112. The hub 112 provides for the connection of a number of gateways 116 to a central server 138. Of course, a hub 112 is not necessary and one or more gateways 116 may be connected directly to or communicate directly with the central server 138. Although only one hub 112 is depicted in FIG. 1, one skilled in the art will appreciate that a greater number of hubs 112 may be employed within the management system 100.

Included within the wireless network 104 are a number of wireless routers 120. The wireless routers 120 may be employed to provide a wireless communications between one or more end devices 124 and a gateway 116. In one embodiment, the routers 120 are used as a signal passing mechanism. In other words, a wireless router 120 is employed when the distance between a gateway 116 and an end device 124 is too great for adequate wireless communications. Therefore, the wireless router 120 may be utilized as a signal amplifier of sorts. As can be appreciated by one of skill in the art, a signal transmitted from an end device 124 may pass through one or more wireless routers 120 before reaching a gateway 116. Likewise, a signal transmitted from a gateway 116 may pass through one or more wireless routers 120 before reaching an end device 124. In one embodiment, the transmission range of wireless end devices 124 employing a power saving wireless communication protocol, such as the ZigBee protocol, is between about 5 ft and 300 ft, depending upon the environment in which the end device 124 is situated. If the distance between a wireless end device 124 and a gateway 116 is so great that consistent and reliable communications could not be achieved, then the wireless end device 124 communicates with a router 120 which either communicates with the gateway 116 or another router 120.

A number of wireless end devices 124 may be employed in the management system 100. Examples of end devices 124 that would be suitable for use in a multi-room facility, such as a hotel for example, include a mini-bar end device, a safe end device, an access end device, a light switch end device, a door switch end device, a sensor end device, a thermostat end device, a window switch end device, a window curtain or blind switch end device, or any other known end device that may be used to monitor and/or control various parameters associated with a room in a multi-room facility.

One or more end devices 124 may be associated with a common room 130, 134 and each of the end devices 124 may be used to monitor and/or control parameters associated with that room 130, 134. As noted above, there may be a number of rooms 130a-N, 134 within a multi-room facility. Each room 130 may comprise similar end devices 124 to other rooms 130 within the multi-room facility. Alternatively, some rooms 130 may include different and/or additional end devices 124 when compared to other rooms within the multi-room facility. A room 130 may or may not be equipped with a wireless router 120 depending upon the size of the room 130 and other considerations. As an example, the first room 130a may be thought of as a first room network comprising a number of end devices 124 dedicated to monitoring and/or controlling various aspects of the first room 130a. The end devices 124 within the first room 130a may communicate with a wireless router 120 on a floor network 128 (i.e., a wireless router 120 located within a hallway or common area that receives/transmits data to/from a number of different room 130 networks. Alternatively, the second room 130b is depicted as comprising a network, which includes a wireless router 120. The wireless router 120 in the second room 130b network may be used to communicate with the end devices within the second room 130b as well as end devices from another room 130 depending upon the proximity of the wireless router 120 to the end devices 124 in the other room 130. The wireless router 120 in the second room 130b network may communicate with another wireless router 120 in the floor network 128 as depicted. Alternatively, the wireless router 120 in the second room 130b may communicate directly with a gateway 116 or with a hub 112.

In accordance with embodiments of the present invention, one or more direct room networks 134 may be employed. A direct room network 134 generally comprises a gateway 116 that communicates with the wired network 108. The direct room network 134 may comprise one or more end devices 124, depending upon the location and needs associated with the room. Although the room 130, 134 networks are depicted as having either one or three end devices 124, one skilled in the art will appreciate that a greater or lesser number of end devices 124 may be associated with a room 130, 134 network.

The wireless communication protocol employed in the wireless network 104 is preferably a low power consumption type communication protocol that does not utilize transmission of continuous communications between devices. In one embodiment, the ZigBee communication protocol is employed in the wireless network 104. The connection between devices in the wireless network 104, in one embodiment, is wireless using IEEE 802.15.4, although other standards could be used as well. The wireless routers 120 act as repeaters or extenders and help increase the distance between a gateway 116 and end device 124, without compromising communication quality.

In one embodiment, each wireless router 120 may communicate with other wireless devices (e.g., a gateway 116, a different wireless router 120, and/or an end device 124) via the same communication channel. This way each wireless device in the wireless network 104 can know a priori what channel should be searched for available wireless communication devices. In an alternative embodiment, a first wireless router 120, or other wireless device, may communicate with associated wireless devices via a first channel while a second wireless router 120, or other wireless device, may communicate with its associated wireless devices via a second different channel. In one embodiment the first and second wireless router 120, or other wireless device, may begin by communicating on the same channel. However, as the communications begin to increase on that channel, one of the wireless routers 120, or other wireless device, may determine that the noise on the channel is exceeding a particular threshold and that wireless router 120, or other wireless device, may change channels. Alternatively, depending upon the amount of intelligence built into the wireless device, the wireless device may advise a controller associated with the central server 138 of the noise level. The controller may then instruct the wireless device and all other wireless devices within the same wireless communication range to change channels.

In accordance with embodiments of the present invention, a beacon mode of communication may be employed in the wireless network 104. While employing the beacon mode of communication, the gateway 116 transmits a beacon at predetermined intervals. The beacon is a request for data from other wireless communication devices (e.g., wireless routers 120 and/or end devices 124). The wireless communication devices look for messages addressed to it. When a properly address beacon is received by a wireless device, the wireless device transmits any required data to the gateway 116. Additionally, upon receiving a beacon a wireless router 120 may generate another beacon for its downstream or children communication devices. In such a configuration, the gateway 116 dictates a schedule for the next beacon so that the wireless communication devices, and the gateway 116, can sleep in between transmission times. This particular embodiment is useful to conserve power in configurations where the gateway 116 and/or wireless routers 120 are internally powered by a battery or the like.

In accordance with alternative embodiments of the present invention, a non-beacon mode of communication may be employed in the wireless network 104. In a non-beacon mode of communication, all parent devices remain awake and ready to receive data from children wireless communication devices. In this particular embodiment, an end device 124 will wait until some sort of activity is detected in association with the end device 124. For example, if activity is detected with the mini-bar, then the mini-bar end device 124 will generate a signal for transmission to a wireless router 120 or gateway 116 representing that mini-bar activity has been detected. In the absence of activity, the end devices 124 wait for control messages from their parent devices in a power saving state. However, since the wireless routers 120 and gateway 116 have to remain awake and ready to receive data from their children, more power is usually required to support the wireless routers 120 and gateways 116.

The wired network 108 generally comprises the hub 112, the central server 138, and a database 140. As noted above, the utilization of a hub 112 may be optional depending upon the type and number of gateways 116 employed. The central server 138 manages all control and monitoring related to data transmitted to/from the end devices 124 in the wireless network 104. In one embodiment, the central server 138 is connected to one or more gateways 116 via a wired connection. In one embodiment the wired network 108 employs a known type of communication protocol such as Ethernet or the like that has a higher data capacity than the wireless network 104. Data transmitted from a gateway 116 to the central server 138 may be stored in the database 140 for future reference or reporting needs. The central server 138 may also be used to automatically manage and control conditions within a number of rooms 130, 134 based on input provided to the central server 138 by end devices 124 within the room 130, 134. The term "server" as used herein should be understood to include any type of dedicated processing unit including a single server, a collection of servers, a personal computer, a laptop, or the like.

Figure 2:
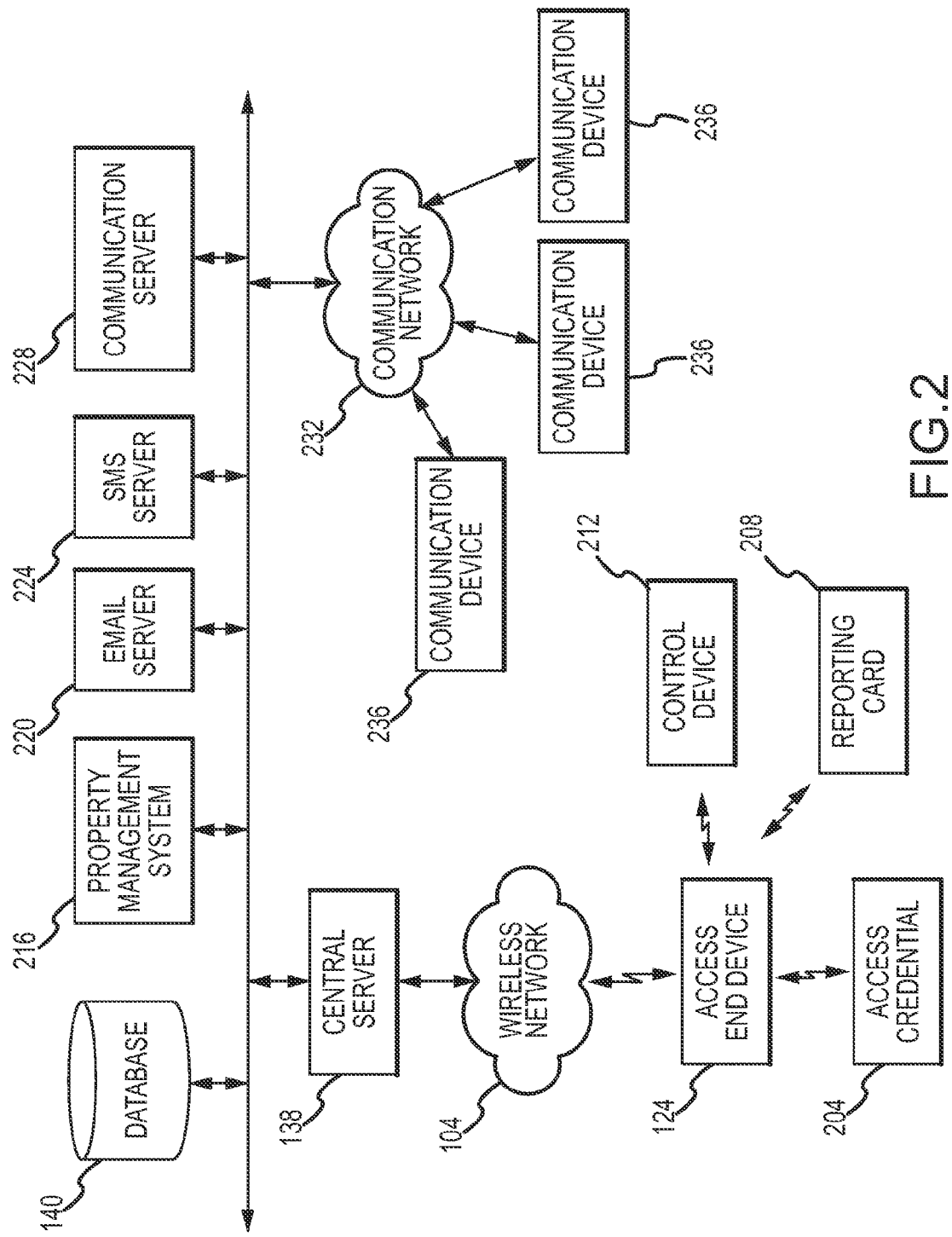
FIG. 2 is a block diagram depicting aspects of a property management service used in connection with a centralized wireless network in accordance with embodiments of the present invention.

FIG. 2 depicts further aspects of a management system 100 in accordance with at least some embodiments of the present invention. The management system 100 may also be employed as an access control system in accordance with embodiments of the present invention. In order to function as an access control system, the management system 100 generally comprises the access end device 124 for communicating with one or more of an access credential, a reporting card 208, and a control device 212. A user may employ an access credential 204 to gain access to an asset within a room 130, 134 or to gain access to the room 130, 134 itself. Examples of assets that may be protected by an access end device 124 and accessed with an access credential 204 include, without limitation, a room 130, 134, a safe, a mini-bar, a television, a password-protected computer, a financial account such as a bank or credit card account, and the like. The access end device 124 may comprise an access control mechanism, such as a lock, that permits/restricts access to an asset based on the access credential 204 that is presented to the access end device 124.

The access credential 204 may comprise any type of convenient form factor such as a smartcard, proximity card, passport, key fob, cellular phone, portable computer and Personal Digital Assistant (PDA). The access credential 204 may communicate with the access end device 124 via using Radio Frequency (RF) signals at a frequency of about 125 kHz or 13.56 MHz depending upon the type of access credential 204 employed. Additionally, the access credential 204 may use the Near Field Communication (NFC) protocol in the event that the access credential 204 comprises an NFC enabled device such as a cellular phone, PDA, portable computer or the like. The access credential 204 contains user specific data that is read by the access end device 124 and used to verify that the access permissions of the holder of the access credential 204 allow the user access to an asset protected by the access end device 124.

The reporting card 208 may also communicate with the access end device 124 using RF signals at a similar frequency to the access credential 204. Property personnel, or even end users such as hotel guests, use the reporting card 208 to update and report the state of a room 130, 134, including features or components within the room, back to the central server 138. A reporting card 208 may include an icon/picture on it that indicates its functionality. The use of icons/pictures on the reporting card 208 helps minimize or eliminate the amount of training required to use the reporting card 208. Once property personnel (such as a maid) has discovered an item he/she wishes to report, the personnel retrieves the appropriate reporting card 208 and presents it to the access end device 124. When the reporting card 208 is presented to the access end device 124, the access end device 124 may generate and send a message to the central server 138 relating to the type of reporting card 208 that was presented to the access end device 124. Such messages may also be presented at the front desk as well as shown or reported to a department manager terminal or be sent to a service person via an SMS or the like as will be described in detail below.

Possible functionalities of reporting cards 208 include, but are not limited to, room 130, 134 cleaned/serviced, major room 130, 134 issue (i.e., room cannot be cleaned and required a high level manager to view the room and guide its service process), Do Not Disturb (DND), safe locked and guest has departed, mechanical problem, TV not functioning, Internet/phone problem, bathroom problem, broken furniture, mini-bar opened and requires service, bell service complete, security guard monitor, service complete (i.e., one or more of the problems described above have been resolved), and so on. Each of the problems described above may require the assistance of different personnel depending upon the nature of the problem. Therefore, the type of reporting card 208 that is presented to the access end device 124 may dictate to whom and by what modality a particular message will be sent.

The control device 212 is another external device that can be used to communicate with the access end device 124 or any other wireless communication device such as other end devices 124, a wireless router 120, and/or gateway 116. The control device 212 may also communicate with the wireless communication devices via RF signals transmitted at one of the above-mentioned frequencies. A user may present the control device 212 to a wireless communication device to open up that wireless communication device to discovery and association with possible children nodes. Alternatively, the control device 212 can be used to request that a wireless communication device begin searching for a parent node in the wireless network 104.

In accordance with embodiments of the present invention, one or a combination of the access credential 204, reporting card 208, and control device 212 may be presented to the access end device 124. Depending upon the apparatus presented to the access end device 124, the access end device 124 may generate a message to send through the wireless network 104 to the central server 138. Again, depending upon the type of message received at the central server 138, the central server 138 may generate a message to transmit to one or more of the database 140, a property management system 216, an email server 220, a Short Message Service (SMS) server 224, communication server 228. The various servers in communication with the central server 138 are generally used to manage the property and respond to events reported at the access end device 124.

For example, the property management system 216 may include an access control host or control panel capable of determining if a particular access credential 204 has permission to access an asset protected by the access end device 124. Of course, in some embodiments, the access end device 124 may be capable of determining whether the access credential 204 is allowed access to an asset protected by the access end device 124 independent of the property management system 216. Additionally, the property management system 216 may be enabled to manage and track the workflow and efficiency of employees in the facility. The property management system 216 may further be equipped with a user interface that allows a system administrator to help manage the network 100.

In accordance with embodiments of the present invention, the property management system 216 is further capable of identifying what type, if any, maintenance is required for a given room 130, 134 based on the reporting card 208 presented to the access end device 124. After identifying the type of maintenance that is required, the property management system 216 may identify the type of maintenance personnel that should be requested to complete the maintenance and how that particular maintenance personnel can be contacted. After making that determination, the property management system 216 may send a request to one or more of the email server 220, SMS server 224, and communication server 228 to have the message transmitted to the identified personnel's communication device 236 via a communication network 232. In other words, the property management system 216 may be responsible for identifying how to contact maintenance personnel and requesting the appropriate server to generate and send a message to the maintenance personnel. As an example, one type of maintenance personnel (e.g., an electrician) may be reachable by email, phone, and SMS, whereas another type of maintenance personnel (e.g., a locksmith) may only be reachable pager. The property management system 216 identifies the best way in which to contact a particular maintenance personnel, which may be based upon user preferences, and causes a message to be sent to the maintenance personnel by that modality. This provides the property management system 216 a greater chance of contacting maintenance personnel when they are needed.

The email server 220 is used to manage email messages for various communication devices 236 connected to the communication network 232. The property management system 216 can use the email server 220 to send email messages to one or more communication devices 236. The email server 220 may also be used to transmit an email message from one communication device 236 to another communication device 236.

The SMS server 224 is similar to the email server 220 in that the SMS server 224 supports all SMS messages being transmitted across the communication network 232. Again, the property management system 216 may employ the SMS server 224 to send SMS messages to a number of communication devices 236 via the communication network 232. Also, the communication devices 236 are capable of communicating with one another via SMS message through the SMS server 224.

The communication server 228 supports all other type of communications between communication devices 236 themselves and between the property management system 216 and the communication devices 236. Examples of communications that are supported by the communication server 228 include voice calls (analog and digital), VoIP calls, video calls, and the like. The communication server 228 may comprise a Private Branch eXchange (PBX) (or other local switching office), which interconnects some of the communication devices 236 to the communication network 232. Alternatively, the communication server 228 may comprise a dedicated server for transferring and/or connecting calls to/from the communications devices 236 connected thereto.

The communication network 232 may comprise any type of information transportation medium and may use any type of protocols to transport messages between endpoints (e.g., communication devices 236 and property management system 216). The communication network 232 may include wired and/or wireless communication technologies. The Internet is an example of the communication network 232 that constitutes an IP network consisting of many computers and other communication devices 236 located all over the world, which are connected through many telephone systems and other means. Other examples of the communication network 232 include, without limitation, a standard Plain Old Telephone System (POTS), an Integrated Services Digital Network (ISDN), the Public Switched Telephone Network (PSTN), a Local Area Network (LAN), a Wide Area Network (WAN), and any other type of packet-switched or circuit-switched network known in the art. In addition, it can be appreciated that the communication network 232 need not be limited to any one network type, and instead may be comprised of a number of different networks and/or network types. The communication network 232 may further include routers (not shown) and proxy servers (not shown) for transmitting data across the communication network 232.

The communication devices 236 may be packet-switched and/or circuit-switched and can include, for example, IP phones, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, Personal Digital Assistants (PDAs), and the like. In accordance with embodiments of the present invention, a communication device 236 may also contain functionality to act as an access credential 204.

As noted above, a log of all messages received and transmitted by the central server 138 may be stored in the database 140 for record keeping purposes. Additionally, messages transmitted and/or received by other servers such as the property management system 216, email server 220, SMS server 224, and communication server 228 may also be stored in a message log on the database 140. The log of messages may be accessed at a later time to determine if illegal activity has occurred or to track and monitor the efficiency of various maintenance personnel.

As can be appreciated by one of skill in the art, a greater or lesser number of servers may be employed in the management system 100. Moreover, one server may comprise the functionality of two or more of the servers described above.

Figure 3:
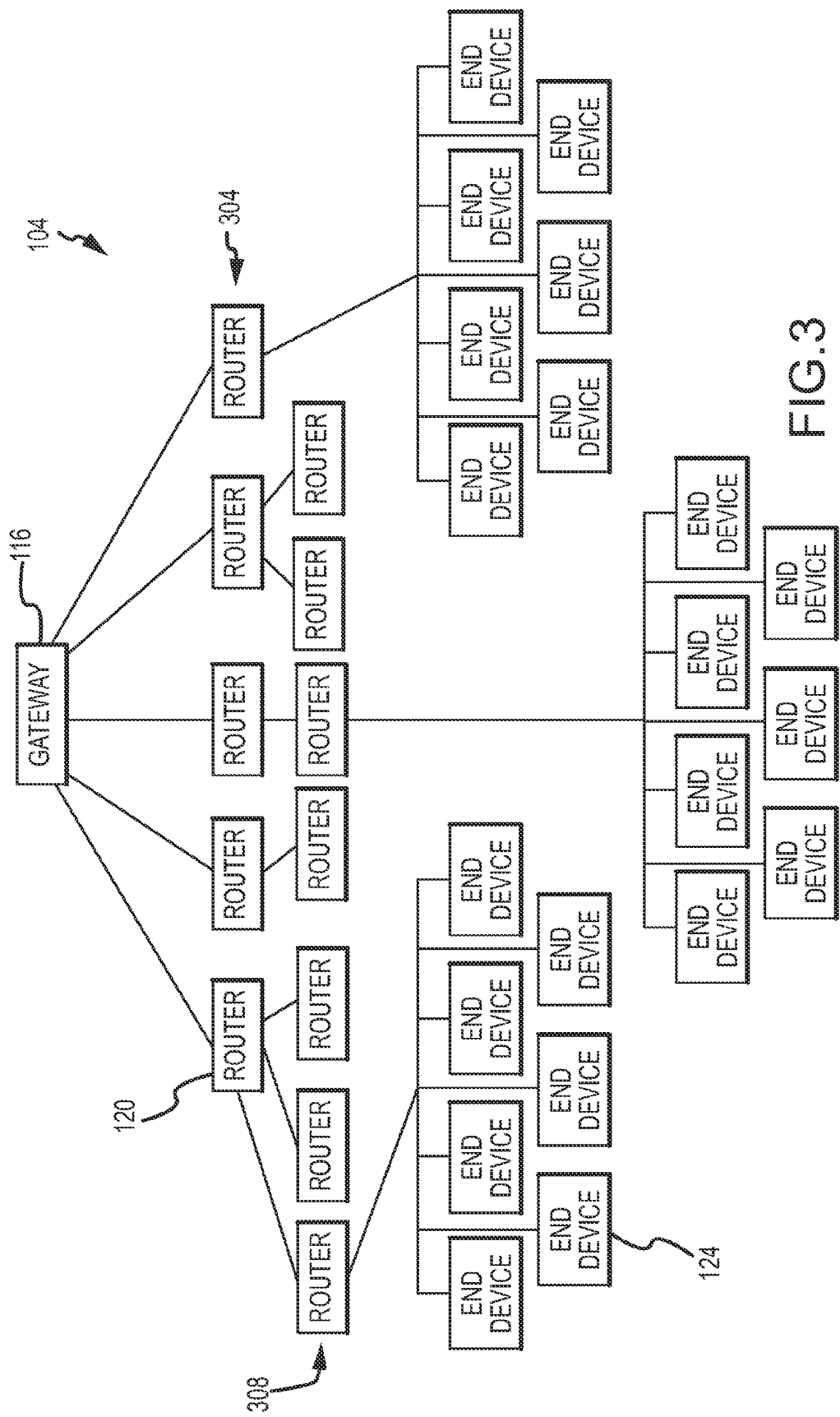
FIG. 3 is a block diagram depicting a centralized wireless network topology in accordance with embodiments of the present invention.

Referring now to FIG. 3, a topology of the wireless network 104 will be described in accordance with at least some embodiments of the present invention. A number of different wireless network 104 topologies may be employed to obtain benefits provided by embodiments of the present invention. Examples of such topologies include a star topology, a peer-to-peer topology, a mesh topology, and combinations thereof. The topology depicted in FIG. 3 comprises a gateway 116 in communication with a first router layer 304. A router 120 in the first router layer 304 may be connected to a router 120 in a second router layer 308. Although only two router layers 304, 308 are depicted, one skilled in the art will appreciate that a greater or lesser number of router layers may be employed. In one embodiment, no router layers are required as each end device 124 communicates directly with the gateway 116. In alternative embodiments, a large number of routers 120 may be employed thereby requiring a large number of router layers.

In accordance with embodiments of the present invention, a combination of a mesh network between end devices 124 and routers 120 and a star network between routers 120 and a gateway 116 is utilized. A gateway 116 may be limited in the number of routers 120 or other wireless devices that it can communicate with. For instance, the gateway 116 may only be allowed to communicate with five end devices, otherwise communications would become too congested and possibly noisy. Likewise, routers 120 in the first layer 304 may be limited in the number of wireless devices that they can communicate with. As an example, the routers 120 in the second layer 308 may only be allowed to communicate with six wireless devices including their parent device (i.e., the router 120 in the first layer 304). In the event that a router 120 is only communicating with end devices 124, the router 120 may be allowed to communicate with more wireless devices. In accordance with one embodiment, each router 120 may be allowed to communicate with up to fifteen end devices 124. In the event that a router 120 is communicating with both end devices 124 and another router 120, the maximum number of end devices 124 that the router 120 can communicate with might decrease.

In accordance with embodiments of the present invention, each end device 124 communicates with only one router 120 or gateway 116. In other words, an end device 124 is limited to having one parent wireless device. Status and other activity information flow from a child device upward to a parent device. Conversely, control signals and/or requests for data flow from a parent device to a child device. As noted above, a router 120 may be in communication with a number of end devices 124 and/or routers 120, which means that a router 120 may communicate with a number of children devices. The router 120 sends control data to its children devices and receives status and activity information from its children devices. However, in accordance with embodiments of the present invention, each router 120 is limited to having one parent wireless device, which may be a router 120 or a gateway 116. It therefore follows that messages transmitted by an end device 124 will always follow the same path through the wireless network 104 en route to the gateway 116, unless of course a router 120 and/or gateway 116 fails, in which case the message path may require alteration. Similarly, control messages transmitted to an end device 124 will also follow the same path through the wireless network 104.

It should be noted that the end devices 124, routers 120, and gateways 116 are not necessarily room related and end devices 124 in the same or different rooms can be connected to the same or different routers 120 or gateways 116 depending on the structure of the network, the distance between wireless devices, and the size of the room.

Figure 4:
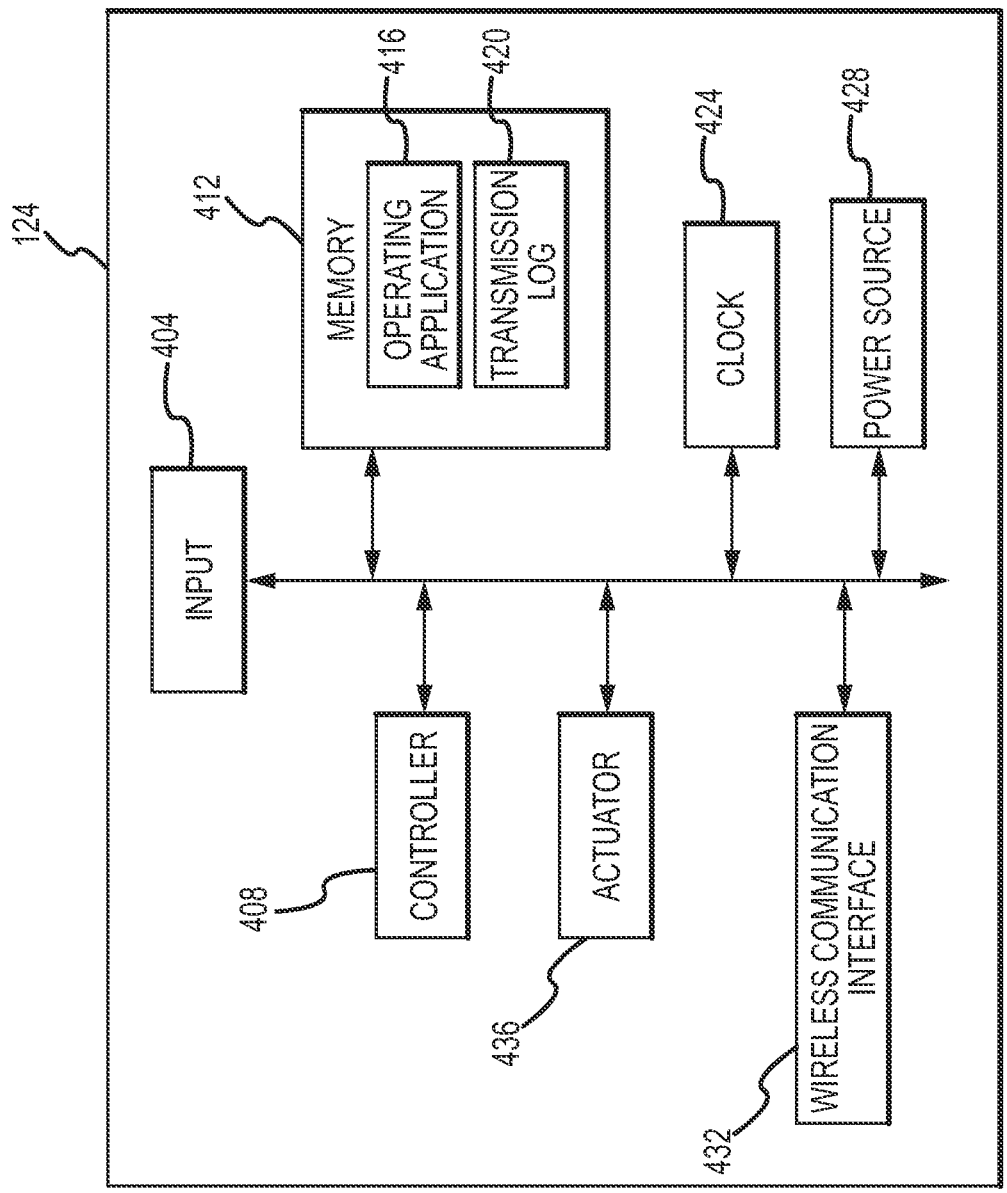
FIG. 4 is a block diagram depicting aspects of an end device in accordance with embodiments of the present invention.

With reference now to FIG. 4, components of an end device 124, such as a ZigBee enabled end device 124, are depicted in block diagram form in accordance with embodiments of the present invention. The components of the end device 124 may include an input 404 for interfacing with a user or the environment about the end device 124. The input 404 may comprise user outputs as well as user inputs. Examples of user inputs include, without limitation, keyboards, keypads, touch screens, touch pads, and microphones. Examples of user outputs include, but are not limited to, speakers, display screens (including touch screen displays), and indicator lights. Furthermore, it can be appreciated by one of skill in the art that the user input may be combined or operated in conjunction with a user output. An example of such an integrated user input and user output is a touch screen display that can both present visual information to a user and receive input selections from a user.

In addition to user inputs and outputs, the input 404 may comprise a sensor or the like for monitoring the environment about the end device 124. Examples of sensors that may be included in the input 404 comprise a temperature sensor, a motion detector, a pressure sensor, an accelerometer, IR sensors, and so on. Activity detected by the input 404 may be included in a message that is ultimately sent to the central server 138.

The input 404 may also include functionality to facilitate communications with other technologies such as the access credential 204, reporting card 208, and control device 212. The input 404 may comprise an RF transceiver for communicating with a proximity card, smart card, NFC enabled device, or the like. Additionally or alternatively, the input 404 may comprise magnetic stripe reading technology that allows the access end device 124 to communicate with magnetic form factors of the access credential 204, reporting card 208, and control device 212. The input 404 may also be equipped to read biometric data from a user in the event that an access control decision requires such data.

The components of the end device 124 may also include a controller 408 comprising a processor capable of executing program instructions. Accordingly, the controller 408 may include any general-purpose programmable processor, digital signal processor (DSP) or controller for executing application programming. Alternatively, the controller 408 may comprise a specially configured application specific integrated circuit (ASIC). The controller 408 generally functions to run programming code implementing various functions performed by the end device 124.

An end device 124 may additionally include memory 412 for use in connection with the execution of programming by the controller 408 and for the temporary or long-term storage of data or program instructions. The memory 412 may comprise solid-state memory resident, removable or remote in nature, such as FLASH, DRAM and SDRAM. In certain embodiments, the memory 412 may be integral to the controller 408. The memory 412 may be volatile and/or non-volatile memory.

The memory 412 may further be used as data storage for application programming and/or access control data. In addition, an operating application 416 may be stored in the memory 412. It should further be appreciated that the programs and data that may be maintained in the memory 412 can comprise software, firmware or hardware logic, depending on the particular implementation of the memory 412. The operating application 416 is implemented by the controller 408 to control the basic functionality of the end device 124. For example, the operating application 416 is used to coordinate communications with other wireless devices. The operating application 416 may also be used to make and/or implement access control decisions, in the event that the end device 124 comprises an access end device 124. The operating application 416 may vary from one type of end device 124 to the next, depending upon the types of input 404 included in the end device 124 as well as the intended functionality of the end device 124. Furthermore, the operating application 416 may enable the end device 124 to communicate with other wireless devices via an agreed upon communication protocol such as the ZigBee protocol. Furthermore, if encryption of messages is required, the operating application 416 may enable the encryption/decryption of message sent and received by the end device 124.

Also included within the memory 412 may be a transmission log 420. The transmission log 420 may be used to store messages between transmission times as well as maintain a historical account of messages that have been sent. This way, if a message is not received by a parent device, the parent device may request that the end device 124 recall the requested message from the transmission log 420 and resend the previously transmitted and lost message. In accordance with embodiments of the present invention, one function of the transmission log 420 is to store data in between previously agreed upon transmission times. In the event that a beacon mode wireless network 104 is employed, messages and other data are maintained in the transmission log 420 until a beacon is received from a parent device. Alternatively, in the event that a non-beacon mode wireless network 104 is employed, the transmission log 420 serves as a storage location for messages sent in the event that the parent device does not receive such messages. In one embodiment of the present invention, the number of messages maintained in the transmission log 420 may be limited. For instance, a capacity of 100 messages may be imposed on the transmission log 420. Under these circumstances, the last 100 transmitted messages may be stored in the transmission log 420 while all other messages are deleted from memory 412.

The end device 124 may further include a clock 424 for coordinating the transmission activities of the end device 124 with its parent. In accordance with at least some embodiments of the invention, the clock may be used as a timer rather than a clock to determine when the end device 124 should wake up and begin transmitting data. After transmission, the end device 124 can go back into a sleep mode where it waits either for the next transmission time or for the detection of some activity via the input 404. By utilizing a sleep mode the amount of energy required to power the end device 124 over time can be greatly reduced when compared to continuous transmission end devices 124.

The clock 424 may also be used to timestamp messages as a mechanism to help ensure messages are being properly transmitted across the wireless network 104 as well as to help ensure the order of the messages is proper when being analyzed at the central server 138. The order in which messages are sent is important as often the determination of the state of a room depends upon the order of messages. Therefore, a series of messages each having a time stamp can be reordered at the receiving end if the order of the messages was somehow mixed up. Additionally, the time stamps can be used to simultaneously analyze data from a number of different end devices 124 since the time it takes a message to traverse the wireless network 104 from one end device 124 to the central server 138 is not guaranteed to be the same as the transmission time for another end device 124. Accordingly, the time stamps can be used to look at the time each message was generated relative to other messages as a part of determining the room state and/or making determinations as to how the room should be managed.

In accordance with at least some embodiments, the end device 124 further comprises an internal power source 428. The power source 428 generates the power to allow the components of the end device 124 to function properly. Examples of an internal power source 428 include, but are not limited to, batteries, a solar cell, and any other known type of autonomous power source. Of course, in some embodiments, the power source 428 may afford for power to be supplied from an external source. In such an embodiment, the power source 428 may comprise a rectifier or power converter. However, in preferred embodiments, the power source 428 is internal making installation of the end device 124 relatively easy when compared to having to install an end device 124 requiring a power converter.

An end device 124 may also include one or more wireless communication interfaces 432. Examples of communication interfaces 432 include, but are not limited to, an RF broadcast transceiver, an optical communication interface, or wireless communication interfaces. The end device 124 utilizes the wireless communication interface 432 to communicate with other wireless devices such as the end device's 124 parent.

In accordance with embodiments of the present invention, the end device 124 may further include an actuator 436 for implementing actions associated with various control signals received from a parent wireless device. Furthermore, the actuator 436 may be used to control access to an asset in the event that the end device 124 comprises an access end device 124. Examples of an actuator 436 include a lock, an electrical and/or mechanical switch, a computer protection program, and so on. The controller 408 controls the actuator 436 based upon the control messages received from the parent of the end device 124.

Figure 5:
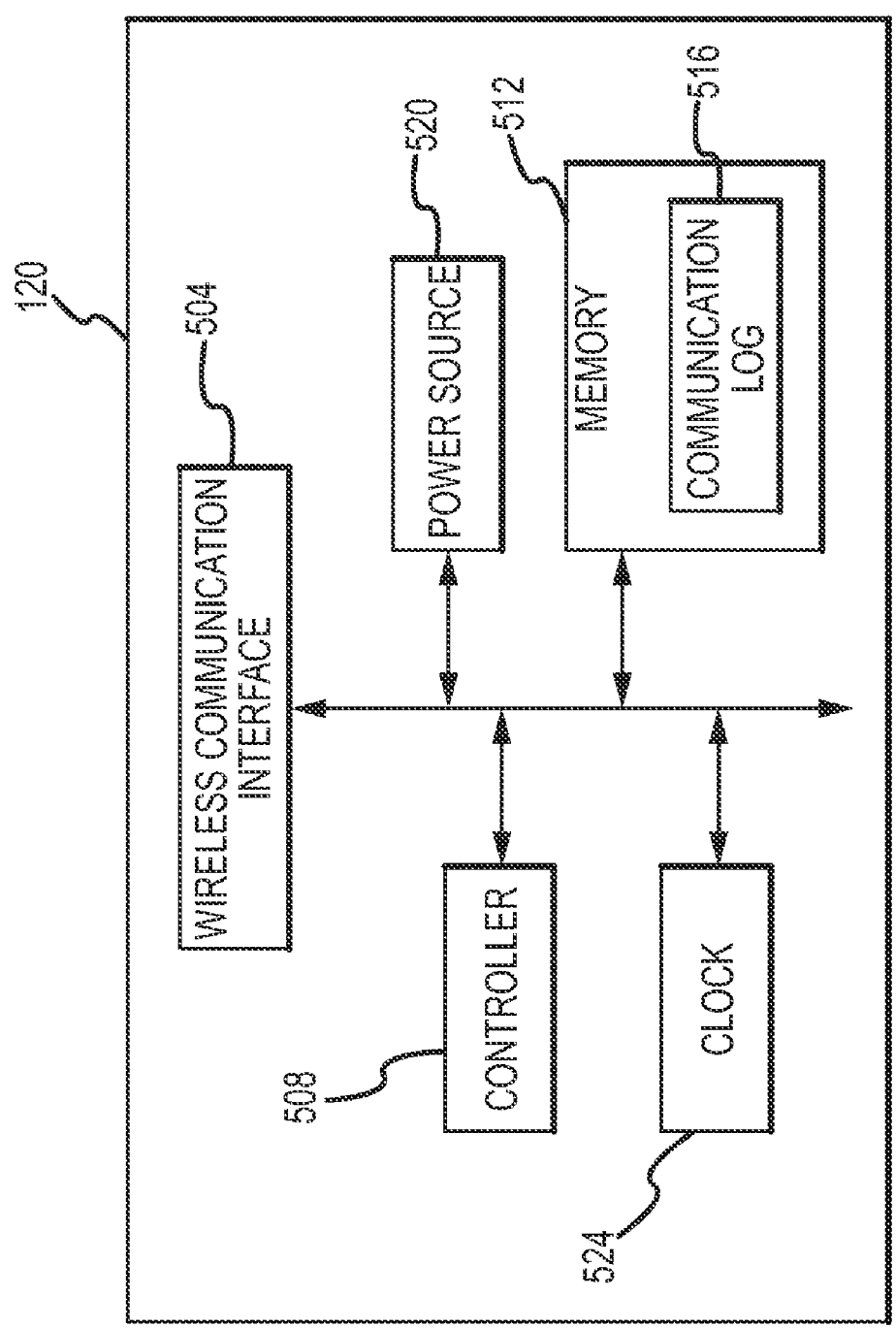
FIG. 5 is a block diagram depicting aspects of a router in accordance with embodiments of the present invention.

FIG. 5 depicts a wireless router 120 in accordance with at least some embodiments of the present invention. The wireless router 120 acts as a message-transferring agent between wireless devices. The wireless router 120 generally comprises a wireless communication interface 504, a controller 508, memory 512 including a communication log 516, a power source 520, and a clock 524. The wireless communication interface 504 is substantially similar to the wireless communication interface 432 of the end device 124. The wireless communication interface 504 permits the router 120 to receive data from a child device and send the same data on to its parent device. Likewise, messages transmitted from the router's 120 parent device may be received at the wireless communication interface 504 and transmitted by the wireless communication interface 504 to a destination child device. In one embodiment, the wireless communication interface 504 is equipped to send and receive RF signals, although other wireless communication modalities can be envisioned.

The controller 508 of the router 120 may comprise a processor capable of executing program instructions for controlling the functionality of the router 120. Accordingly, the controller 508 may include any general-purpose programmable processor, digital signal processor (DSP) or controller for executing application programming. Alternatively, the controller 508 may comprise a specially configured application specific integrated circuit (ASIC). The controller 508 generally functions to cause a received message to be retransmitted to the appropriate wireless device.

Similar to the end device 124, the router 120 may additionally include memory 512 for use in connection with the execution of programming by the controller 508 and for the temporary or long-term storage of data. The memory 512 may comprise solid-state memory resident, removable or remote in nature, such as FLASH, DRAM and SDRAM. In certain embodiments, the memory 512 may be integral to the controller 508. The memory 512 may be volatile and/or non-volatile memory. In accordance with one embodiment of the present invention, the memory 512 comprises a communication log 516. The communication log 516 may be used to store a record of previously sent messages. Alternatively or in addition, the communication log 516 may be used to store messages during periods of inactivity or when one or more wireless devices have failed in the wireless network 104. In still other embodiments, the memory 512 may be used as a buffer to temporarily store received messages prior to retransmission.

The power source 520 is used to provide power to the various components of the router 120. The power source 520 may comprise an internal power source, a rectifier for an external power source, or combinations thereof. In the event that the power source 520 comprises a purely internal power source, such as batteries, then the wireless network 104 may be operated in a beacon mode. Alternatively, if perpetual power is available to the router 120 via an external power source, then the wireless network 104 may be operated in a non-beacon mode since power conservation for the router 120 is not as large a restraint.

The clock 524 is used by the router 120 to coordinate communications and/or to timestamp messages. As noted above, in some embodiments the router 120 may need to know when to wake up in order to properly relay messages received from a child device to a parent device and vice versa. Moreover, the router 120 may timestamp messages to help a system administrator determine whether the wireless network 104 is functioning properly or if a number of wireless devices should change channels.

Figure 6:
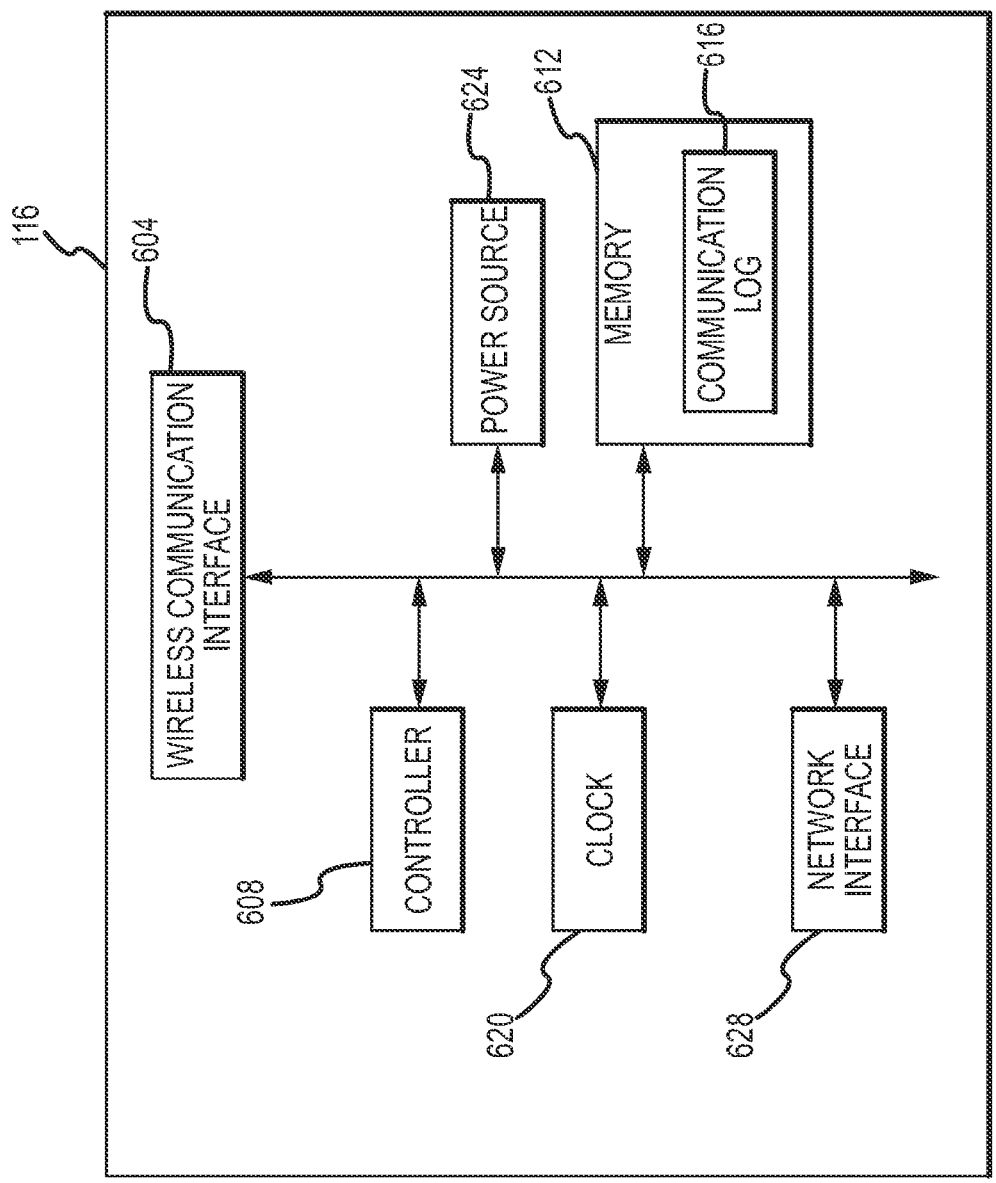
FIG. 6 is a block diagram depicting aspects of a gateway in accordance with embodiments of the present invention.

FIG. 6 is a block diagram depicting components of a gateway 116 in accordance with at least some embodiments of the present invention. Components that may be provided in the gateway comprise, without limitation, a wireless communication interface 604, a controller 608, memory 612 including a communication log 616, a clock 620, a power source 624, and a network interface 628. The wireless communication interface 604 permits the gateway 116 to communicate with its children wireless devices (e.g., router 120 and/or end device 124). In one embodiment, the wireless communication interface 604 is equipped to send and receive RF signals via a communication protocol such as the ZigBee protocol.

The controller 608 of the gateway 116 may comprise a processor capable of executing program instructions for controlling the functionality of the gateway 116. Similar to the controllers of the router 120 and end device 124, the controller 608 may include any general-purpose programmable processor, digital signal processor (DSP) or controller for executing application programming. Alternatively, the controller 608 may comprise a specially configured application specific integrated circuit (ASIC). The controller 608 generally functions to cause a received message to be retransmitted to the appropriate wireless device.

Memory 612 may be provided for use in connection with the execution of programming by the controller 608 and for the temporary or long-term storage of data. The memory 612 is similar to the memory 512 of the router 120 in a number of respects. For instance, the memory 612 may comprise solid-state memory resident, removable or remote in nature, such as FLASH, DRAM and SDRAM. Other qualities of the memory 612 may be similar to the memories described above.

In accordance with embodiments of the present invention, the memory 612 comprises a communication log 616. The communication log 616 is used to store messages already transmitted or not yet transmitted across the wireless network 104. The communication logs 420, 516, 616 should comparable in that messages sent from a gateway 116, through a router 120 to an end device 124 can be recorded in each communication log 420, 516, 616. A comparison of communication logs can be performed to determine if any messages have been lost or otherwise unaccounted for. In accordance with one embodiment of the present invention, the central server 138 or property management system 216 may request various wireless devices to transmit contents of the communication logs so that a transmission quality audit can be performed. Alternatively, if the central server 138 or property management system 216 think that a message may have been lost based on the order of received messages or they would like to confirm that a control message was received, then the contents of the communication logs can be requested as well.

The clock 620 is used by the gateway in a similar fashion to the clocks of the router 120 and end device 124. In accordance with embodiments of the present invention, the clock 620 helps to coordinate communications and/or to timestamp messages. The clock 620 may also be used by the gateway 116 to help determine when a beacon should be sent, assuming that a beacon mode wireless network 104 is employed.

The power source 624 is used to provide power to the various components of the gateway 116. In a preferred embodiment, the power source 624 comprises a rectifier for conversion of an external power source into a useable form of power for the components of the gateway 116. Of course, in alternative embodiment an internal power source, such as a back up power source, may be used alone or in combination with the rectifier. Examples of a suitable power source 624 for the gateway 116 include, but are not limited to, Power over Ethernet, a 12 VDC power supply, a 6 VDC power supply, or the like.

The network interface 628 is used to connect the wireless network 104 to the wired network 108. Examples of network interfaces 628 include, but are not limited to, a network interface card, a modem, a wired telephony port, a serial or parallel data port, radio frequency broadcast receiver, a USB port, or other wired or wireless network interfaces. In accordance with embodiments of the present invention, the network interface 628 comprises an Ethernet port that connects the gateway 116 to an IP network.

Figure 7:
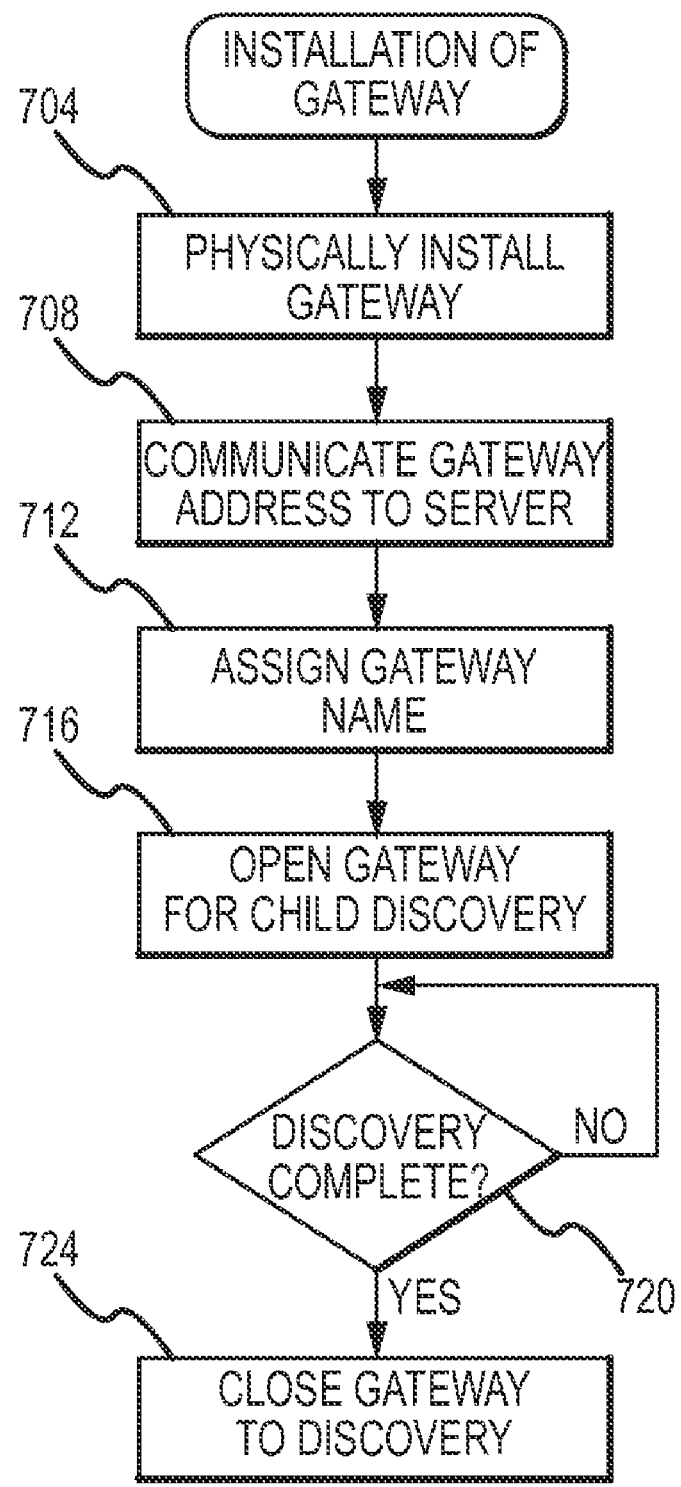
FIG. 7 is a flow diagram depicting aspects of a method for installing a gateway in accordance with embodiments of the present invention.

FIG. 7 is a flow diagram depicting a method of installing a gateway 116 in accordance with at least some embodiments of the present invention. Initially, a gateway 116 is physically installed at the desired location (step 704). An appropriate location for a gateway 116 may include any location where the gateway 116 will have connectivity to a wired network 108. After the gateway 116 has been physically installed and connected to the wired network 108, the gateway 116 communicates its address to the central server 138 and another other server that may require such information (step 708). The gateway 116 address may be in the form of an IP address or other known routing address that allows the central server 138 to know how messages destined for the gateway 116 should be addressed or directed. The gateway 116 address may also contain the physical location of the gateway 116. In accordance with embodiments of the present invention, the central server 138 maintains a table of gateway 116 addresses in memory of the server and/or in the database 140. The table of addresses may be referenced when the central server 138 sends a message to a particular gateway 116. The address may be included in packet headers when transmitting the message across the wired network 108.

Once the gateway 116 address has been received by the central server 138, a name is assigned to the gateway 116 (step 712). The name may be automatically assigned to the gateway 116 by the central server 138 or by a system administrator. The name assigned to the gateway 116 may reflect the physical location of the gateway 116 in accordance with some embodiments of the present invention. For example, the gateway 116 may receive a name such as "third level gateway" or "atrium gateway." The assigned name may be stored in association with the gateway 116 address such that the address can be retrieved by knowing the gateway name and vice versa.

With a name assigned to the gateway 116, the gateway 116 may be opened for child discovery (step 716). To associate with its children, regardless of whether the children comprise a router 120, an end device 124, or both, the gateway 116 should be left open such that the children devices can associate with the gateway 116 and establish a communication link. The gateway 116 may be opened by a number of different means. For example, a system administrator may select an icon at the main user interface, usually associated with the central server 138 or property management system 216, to open the gateway 116 to wireless communications. Alternatively, the gateway 116 may be opened to discovery by pressing a switch on the gateway 116. Once pressed, a predetermined feedback may be displayed to the user indicating that the gateway 116 has been opened to discovery. In still a further alternative embodiment, a control device 212 may be presented to the gateway 116 to open the gateway 116 to discovery.

As a part of the child device discovery process, the child units may send information to the central server 138 via the parent gateway 116 such that the child presents themselves at the central server 138 as a new child of the gateway 116. In accordance with embodiments of the present invention, the discovery process in carried out according to the ZigBee protocol. The central server 138 may utilize this information to build a family tree or picture of the wireless network 104 architecture in the same storage space where the gateway 116 name and address are located. More specifically, the name and address of each child of the gateway 116 may be stored in association with the gateway 116 name and address thereby creating a logical connection between the gateway 116 and its children. Therefore, when the central server 138 wants to send a message to an end device 124, it will know what gateway 116 has established a communication link with the subject end device 124 and thus will know to which gateway 116 the message should be sent. The name and number of each end device 124 may also be maintained in the family tree information stored by the central server 138. In accordance with embodiments of the present invention, those devices may be displayed along with their name to a system administrator via a Graphical User Interface (GUI) associated with the central server 138 and/or property management system 216.

Additionally, the gateway 116 may maintain a list of its children devices in memory 612, such that the gateway 116 can know how to address messages to different children devices. Accordingly, a redundant set of family tree (network architecture) lists may be stored at the central server 138 and/or database 140 and the gateway 116. This may prove useful in the event that either the central server 138 or gateway 116 fails, such that a restored version of the failed device may retrieve the network architecture information from the other unaffected device.

The gateway 116 is left open to discovery until either it has reached its device capacity or all of the possible children devices have associated with the gateway 116. Therefore, the gateway 116 will continue to determine if the discovery is complete (step 720). This determination may be made by asking a system administrator if all of the desired children have associated with the gateway 116. Alternatively, the gateway 116 may be left open to discovery for a predetermined amount of time before it is closed to discovery. Once it is determined that the discovery process has completed for the gateway 116, the gateway 116 is closed to discovery. At this point all of the communication links created during discovery are the only allowable communication links for the gateway 116, unless the gateway 116 is reopened to discovery (step 724). In other words, in one embodiment, children devices may only be associated with the gateway 116 while the gateway 116 is open to discovery. Otherwise, the potential children devices will need to attempt to associate with a different parent device.

Figure 8:
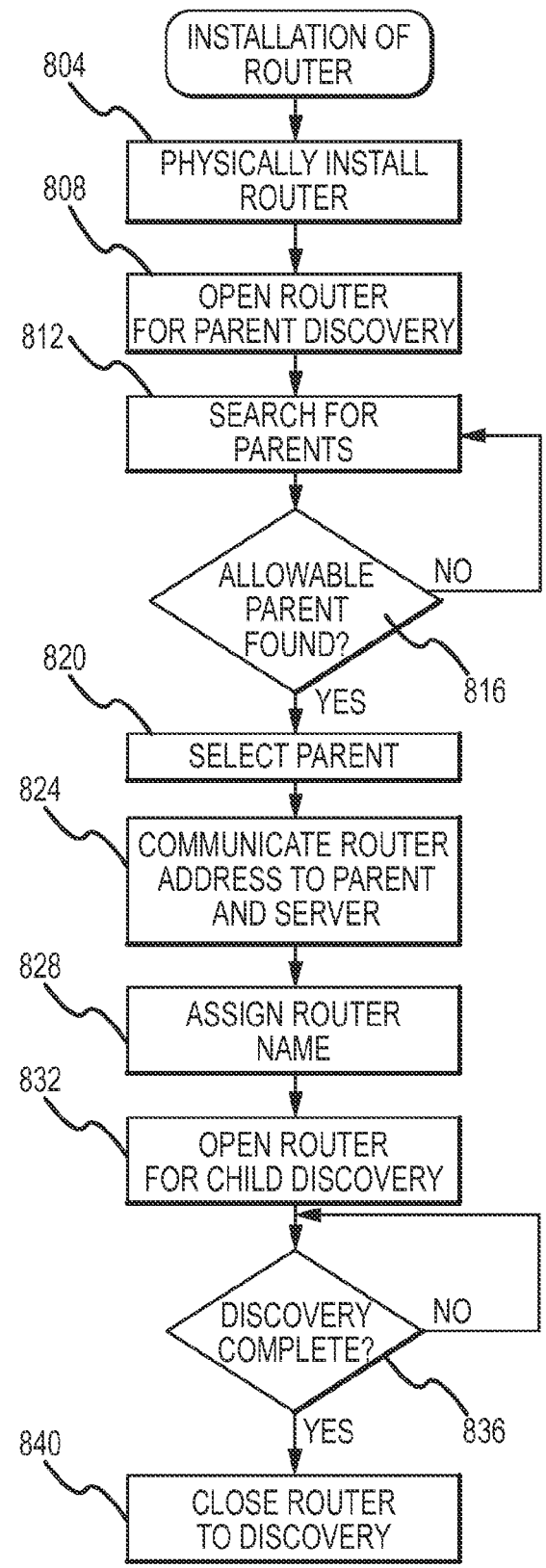
FIG. 8 is a flow diagram depicting aspects of a method for installing a router in accordance with embodiments of the present invention.

FIG. 8 is a flow diagram depicting a method of installing a router 120 in accordance with at least some embodiments of the present invention. The method is initiated when a router 120 is physically installed (step 804). The physical location of the router 120 may vary depending upon the network 104 needs and the number of end devices 124 that require service. Furthermore, the location of the router 120 will also depend upon the location of other routers 120 and gateways 116 in the wireless network 104. In accordance with embodiments of the present invention, the router 120 may be mounted at a given location through the use of a Velcro® strap or the like. The router 120 may also be mounted in a hidden fashion such that the casual passerby cannot see it. For instance, a router 120 may be hidden in a room sign, bell, and/or DND mounting that is installed within a wall or door. Alternatively, the router 120 may be hidden in an electrical J box mounted within a wall.

Once the router 120 is physically installed, the router 120 is opened for parent discovery (step 808). In the parent discovery mode, the router 120 searches for a wireless device (e.g., another router 120 or gateway 116) to which the router can send status and activity data to and receive control data from (step 812). While trying to find a parent device, the router 120 determines if it can connect to a located parent or in other words, the router 120 determines if it is allowed to associate with a located parent device (step 816). In some embodiments, the router 120 may detect the RF activity of a wireless device but that wireless device may be closed to discovery. Under these circumstances, the detected wireless device may have reached its device capacity and cannot support an additional child device. Alternatively, the detected parent device may be closed to discovery in order to "force" the router 120 to choose a parent that the system administrator wants chosen, rather than allowing the router 120 to choose any parent. In this particular embodiment, a system administrator can force communication paths from one router 120 to the next until it finally reaches a chosen gateway 116. This is different from current ZigBee mesh networks that allow wireless devices to change which device they are associated with in a somewhat improvised manner.

If the router 120 cannot find an allowable parent, then the method will return to step 812 and the router 120 will continue to scan various channels until an allowable parent device is found. Once the router 120 has found an allowable parent device, the parent device is selected (step 820). Once the parent device has been selected, the router 120 establishes a communication link with the selected parent by communicating its address to the parent device (step 824). The parent device subsequently communicates the router 120 address to its parent, and this continues until the router 120 address is communicated to a gateway 116 and ultimately the central server 138 (step 824). All along the way each parent device may store the router 120 address in memory such that the wireless network 104 architecture is maintained by more than just the central server 138.

When the central server 138 receives the router 120 address, the central server 138 may assign the router 120 a name (step 828). The name assigned to the router 120 may be similar to the name assigned to the gateway 116 in that the name may represent the physical location of the router 120 and/or the devices with which the router 120 is associated.

Once the router 120 has established a communication link with its parent, the router 120 is opened for child discovery (step 832). The router 120 may be opened to parent discovery and/or child discovery by using a control device 212 or other mechanisms described above in association with opening a gateway 116 to discovery. The router 120 is left open until the child discovery process is completed (step 836). Until the router 120 is closed to child discovery, any other router 120 and/or end device 124 may establish a communication link with the router 120 thereby associate with that router 120. In some embodiment, a router 120 may be installed to relieve the burden on another wireless devices such as a router 120. In this case, the router 120 may allow children previously associated with another router 120 to associate with it. Once the child device has switched to the router 120, a communication link may be established by having the child device send the router 120 its address. Once the child discovery process is completed, the router 120 is closed to child discovery and the method is completed (step 840).

Figure 9:
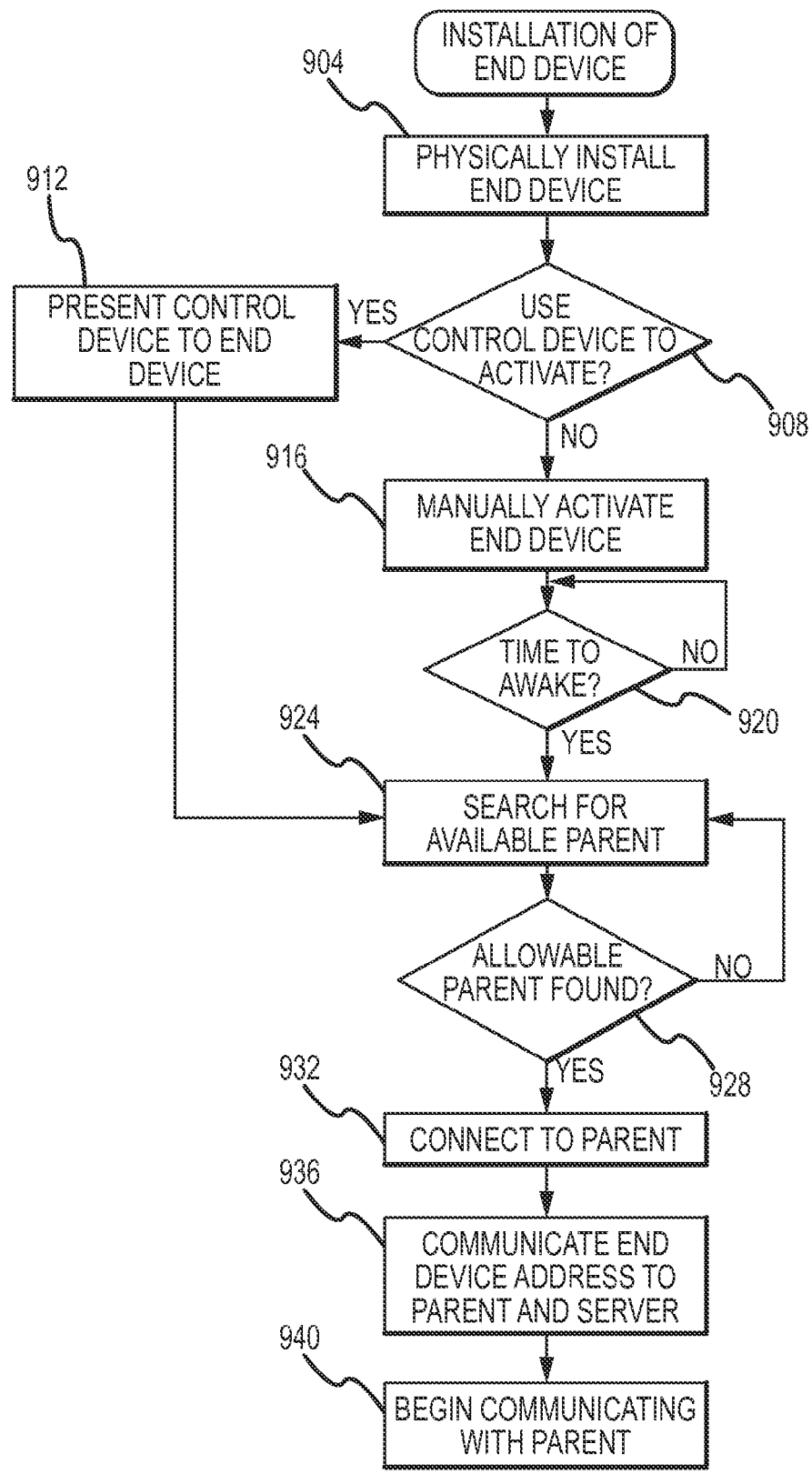
FIG. 9 is a flow diagram depicting aspects of a method for installing an end device in accordance with embodiments of the present invention.

FIG. 9 is a flow diagram depicting a method of installing an end device 124 in accordance with at least some embodiments of the present invention. Similar to the gateway 116 and router 120, the method begins when the end device 124 is physically installed (step 904). There may be a number of end devices 124 installed in a common room. End devices 124 may also be installed in a non-room environment such as a hallway or outdoors. Once the end device 124 has been installed, it is determined if a discovery card or control device 212 will be used to activate the end device 124 (step 908). In the event that a control device 212 will be used, the control device 212 is presented to the end device (step 912). Upon detecting the presence of the control device 212, the end device 124 begins searching for an available parent similar to the way that the router 120 searched for a parent device (step 924).

If a control device 212 will not be used to activate the end device 124, the end device 124 is manually activated by powering up the end device 124 or pressing a reset button (step 916). Once the end device 124 has been powered up, the end device 124 stays in a sleep mode until it is time to awake and search (step 920). In one embodiment, the wireless communication interface 432 may comprise a built in mechanism that determines when wireless communications should occur. During all other times the wireless communication interface 432 is inactive in an attempt to preserve energy resources.

Once it becomes time for the end device 124 to awake, the end device activates the wireless communication interface 432 and begins searching for an available parent device (step 924). While searching for a parent device, the end device 124 determines if any possible parent devices are within wireless communication range. If a wireless communication device is detected, the end device 124 then determines if that device is open and able to associate with another end device. If no allowable parents are found, the end device 124 may return to a sleep mode and try searching for a parent device at a later time. Alternatively, the end device 124 may continue searching for an available and allowable parent device (step 924).

If the end device 124 identifies an allowable parent device, then the end device 124 will connect with the parent device and begin communications with that parent device (step 932). After connecting with the parent device, the end device 124 will transmit its address to the parent, which is ultimately relayed to the central server 138 (step 936). The address is incorporated by the central server 138 into the records of the network architecture and associated with the wireless devices that receive/transmit messages from and to the end device 124. Similar to other wireless devices, the end device 124 may receive a name when its address is communicated to the central server 138. This name may also be stored in association with the end device 124 address and the network architecture. After the end device 124 has properly communicated its address to the parent device, the end device 124 and its parent know the address of the other device and each can begin communicating with one another (step 940). The communication session between the end device 124 and its parent may comprise the end device 124 sending status and activity related messages to the parent device and the parent device sending control messages to the end device 124.

Figure 10:
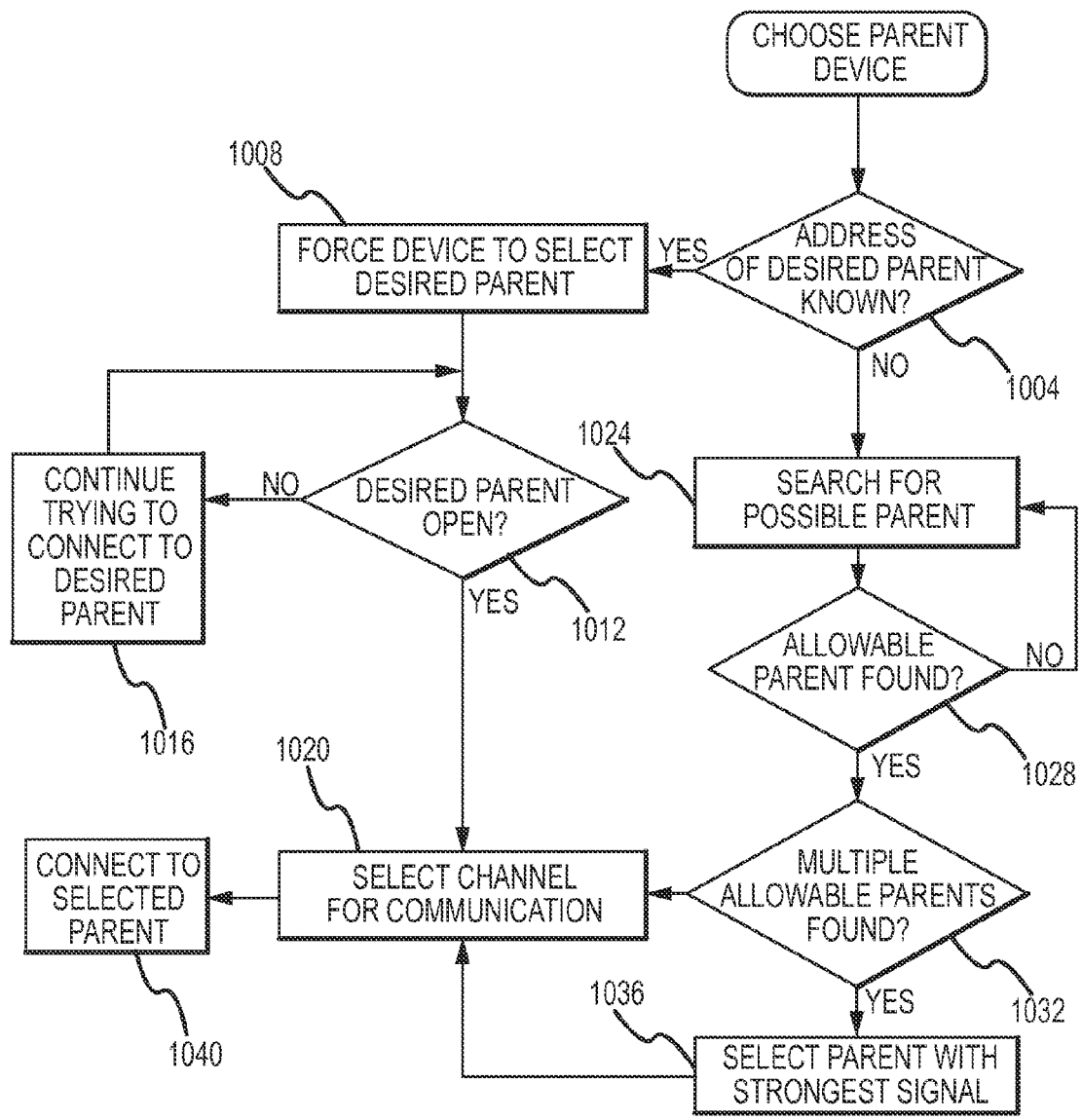
FIG. 10 is a flow diagram depicting aspects of a method for choosing a parent device in accordance with embodiments of the present invention.

FIG. 10 is a flow diagram depicting a method of choosing a parent device in accordance with at least some embodiments of the present invention. When trying to establish a communication link between a child wireless device and a parent wireless device, the child wireless device may be free to chose a parent based on the availability of parents at the time of discovery or the child may be forced to chose a predetermined parent as dictated by a system administrator or installation personnel. The method begins when it is determined if the address of a desired parent is known (step 1004). This may be determined affirmatively if the system administrator provides the child device with the address or identity of a parent device. If no address or identity of a parent device is provided to the child device, then the question may be answered negatively.

In the event that the address of a desired parent is known before the child device is allowed to start parent discovery, the address is provided to the child device thereby forcing the child device to select the desired parent (step 1008). The child device then begins searching the RF spectrum for a device having a matching address. A series of query and response messages may be transmitted between the child device and other wireless devices. The child device may send a request for any wireless device receiving the message to transmit their address. The child device will analyze the responses to its query to determine if one of the responding wireless devices has a matching address. The child device searches for the matching address in order to determine if the desired parent is open and responding to queries generated by the child device (step 1012). In the event that the child device does not receive a response with a matching address, the child device will continue searching and trying to connect to the desired parent device (step 1016). Reasons why a desired parent may not currently be available when the child device is searching for the parent is that there may be some lag time between activating the child device for discovery and the parent device for discovery. Alternatively, the parent device may be closed to discovery until one of its previously assigned child devices has re-associated with another parent device thereby allowing the desired parent device to open itself to discovery by the child device.

Once the child device identifies that the desired parent is available, the parent and child devices exchange addresses and begin creating a communication link. As a part of developing a communication link, the child and parent device may negotiate a channel on which they will operate (step 1020). In accordance with one embodiment, the selected channel depends upon the channel that the parent is already using to communicate with other children devices. In accordance with an alternative embodiment, both devices may scan a number of channels and decide which channel has the least amount of traffic and choose that channel.

Referring back to step 1004, in the event that there is no predetermined parent for the child device, the child device begins searching for a possible parent device (step 1024). The search conducted by the child device may include scanning one or a number of different bandwidths and channels within those bandwidths for RF activity. While searching for RF activity, the child device is determining if an allowable parent is found (step 1028). More specifically, detecting RF activity does not necessarily mean that the active RF device is open to discovery. Also, if the RF signal is so weak that a reliable wireless connection may not be possible, the child device may decide that no allowable parent is found and continue searching for a possible parent in step 1024. However, in the event that at least one allowable parent device is identified, and those parent devices are open to discovery and association with a child device, the child device determines if multiple allowable parents are found (step 1032). If more than one allowable parent is found, then the child device selects the parent with the strongest signal, which is preferably the parent device in closest proximity to the child device (step 1036). After the parent device has been selected from multiple parent devices or if there was only one allowable parent device, they method continues to step 1020 where a channel is selected for wireless communication. The channel selection method will be described in more detail below, but it should be noted that in some cases a few channels may be blocked or do not represent the best communication quality at the time of installing a child device. Accordingly, in accordance with embodiments of the present invention, the method may try and find the best channel to transmit and receive on (i.e., the channel with the lowest noise level). However, this may be in conflict with what the system administrator knows about the channels and what might occur at a later time. Under these circumstances, if the system administrator may force the child and parent device to use a certain channel. As an extension, the system administrator may choose various frequencies for different room 130, 134 and floor 128 networks in an attempt to minimize the interference between networks within the wireless network 104.

After the channel has been negotiated between the child device and the parent device and each device has shared its address, the child and parent device establish a communication link and the child device connects to the selected parent (step 1040).

In addition to creating a fast debug process, there may be a need for a system administrator or other installation technician to differentiate between a malfunctioning wireless communication interface 432, 504, 604 and a malfunctioning wireless device itself. To achieve such a determination, the wireless device may be activated at the device level to test the wireless communications quality. Once activated, user feedback in the form of LED blinking lights and/or sound variations based on the status of the communication between wireless devices may be provided to the system administrator. This way, it can easily be determined if the wireless devices are communicating properly or if the child device should connect to a different parent device.

In accordance with embodiments of the present invention, a solution for routing a wireless network 104 through a long corridor or the like may be provided. Due to building configurations of long corridors, especially in the hospitality/hotel and motel industry, the distances between child and parent devices may be controlled such that wireless communications in the wireless network 104 are optimized. In one embodiment, each end device 124 will attempt to associate with the closest parent device, rather than the natural ZigBee configuration, which allows an end device 124 to associate with any available parent device, which is available at the time of the search, but is far away in comparison to other potential parent devices not currently open to discovery. Forcing wireless devices to connect to one another, at the time of installation, to optimize communication quality is one of many unique characteristics of embodiments of the present invention.

Figure 11:
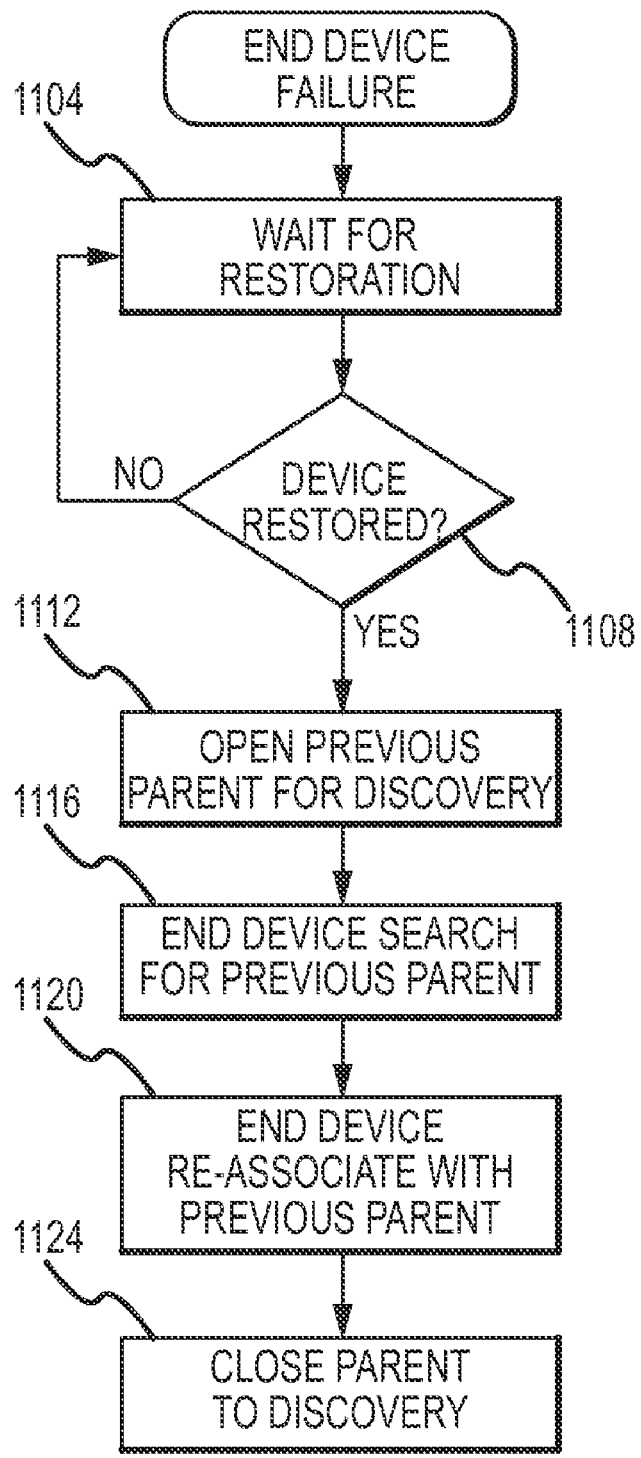
FIG. 11 is a flow diagram depicting aspects of a method for recovering from and end device failure in accordance with embodiments of the present invention.

FIG. 11 depicts a method of recovering from an end device 124 failure. The method begins when an end device 124 fails and the end device's 124 parent waits for the restoration of the end device 124 (step 1104). The parent device continues to search for activity from the end device 124 until some RF activity is detected from the end device (step 1108). Once the parent notices that the end device 124 has been restored, the parent device is opened for discovery again (step 1112). Opening the parent device for child discovery allows the end device 124 to reestablish a communication link with the parent device.

With the parent device open for discovery, the end device 124 begins searching for the previous parent (step 1116). Upon detecting the previous parent, the end device 124 will begin re-associating with the previous parent (step 1120). During the re-association step, the devices may exchange addresses and names such that the network architecture is restored in the memory of the parent device. Alternatively, the parent device may maintain the address of the failed end device 124 and a simple reconnect message may be all that is required to establish the communication link between the parent device and the end device 124.

Once the end device 124 has successfully re-associated with the parent device, the parent device is closed to child discovery (step 1124). Closing the parent device to additional discovery helps to limit the chances of another wireless device switching over to communicating with the parent device. Another step that may be taken is that the parent device may only be opened to a limited child discovery whereby only the address of the failed end device is allowed to create a communication link with the parent device. However, this may be problematic in situations where the end device 124 has failed catastrophically and requires a replacement end device 124.

Figure 12:
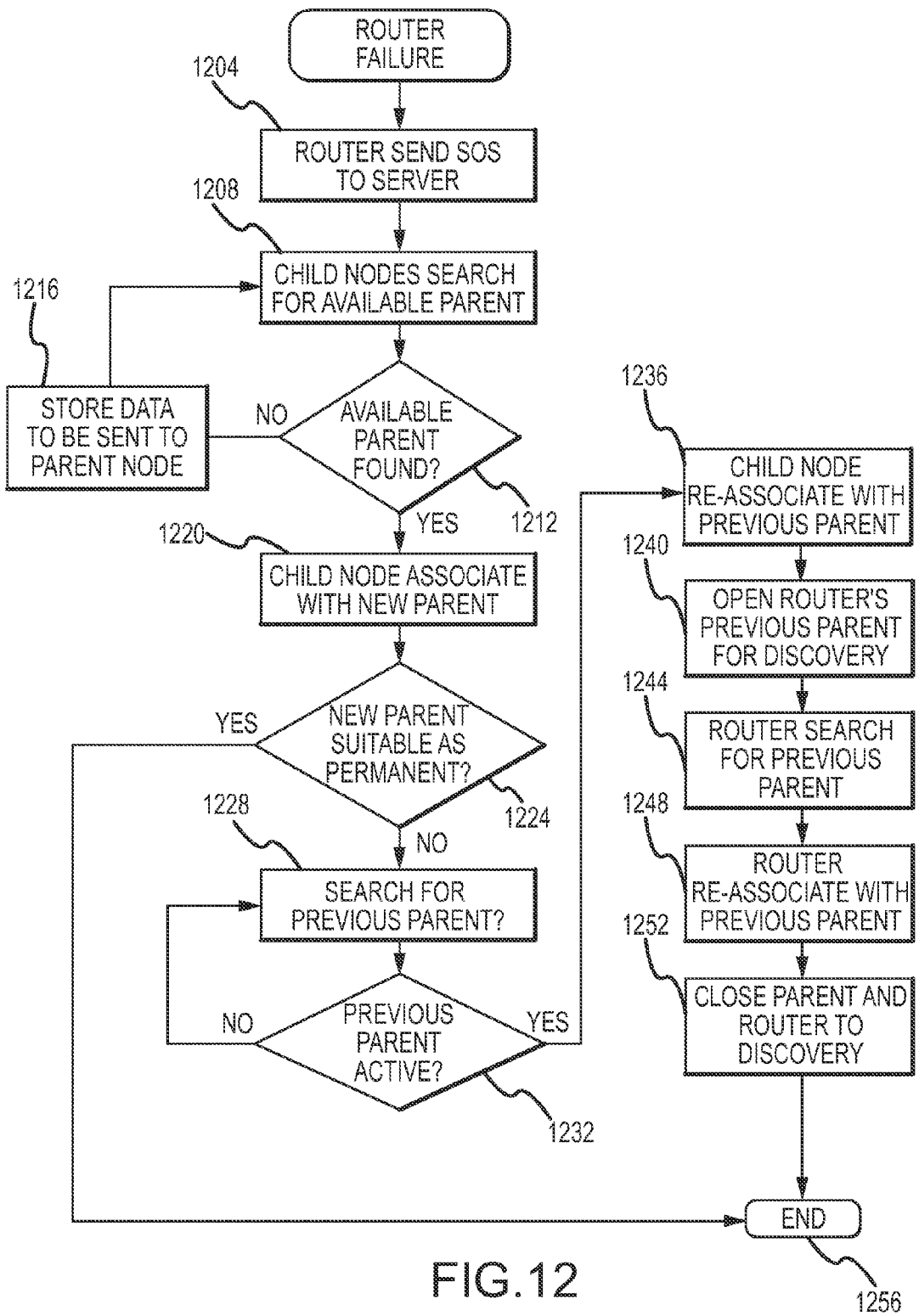
FIG. 12 is a flow diagram depicting aspects of a method for recovering from a router failure in accordance with embodiments of the present invention.

With reference now to FIG. 12, a method of recovering from a router 120 failure will be described in accordance with at least some embodiments of the present invention. When a router 120 fails, the router 120 sends an SOS message to the central server 138 indicating that it will soon completely fail (step 1204). The power used to send the SOS message may be provided by a backup capacitor that is capable of providing enough energy to transmit one last message in case the primary power supply to the router 120 fails. Of course, the router 120 may undergo certain types of failures that do not allow it to transmit an SOS message. For example, if the wireless communication interface 504 of the router 120 suddenly fails, it may not be possible for the router 120 to communicate an SOS message to its parent and ultimately the central server 138.

After the SOS message is sent, the router 120 presumably fails and becomes unavailable to service its previous children devices. As a result of the router 120 failing, the child devices begin searching for another available parent (step 1208). In this step, the child devices may simply begin scanning for RF activity to determine whether a particular parent device is active and available (step 1212). Alternatively, the child devices may be provided with or may have previously been provided with an address of an alternative parent device in the event that the first assigned parent device became unavailable for any reason. In this particular embodiment, the child device may send a query message out to all parent devices requesting a response with an address or other type of identification. If the alternative parent device responds, then the child device may associate with the alternative parent device.

In accordance with embodiments, when the central server 138 receives an SOS message, it may reference the database 140 to determine what child devices will be affected by the failed router 120 and may also identify which alternative parent devices should be opened to child discovery. When the central server 138 identifies the alternative parent devices, the central server 138 may send a command message to each identified parent device requesting it to open to child discovery or at least requesting that it opens itself to a limited child discovery. If the child nodes of the failed router 120 cannot find an available parent, then the child nodes will store data that was supposed to be sent to its parent node (step 1216). This way no data is lost as the result of the router 120 failing. Instead, the child node will continue to store the data until it associates with either another parent or its previous parent, at which time the child node can begin sending data again to the parent, including sending any data that was stored while it was searching for a parent device.

When the child node finds a new parent (which may be the previous parent if the failed router 120 has been restored), the child node associates with the new parent (step 1220). The association with the new parent is performed in a similar fashion to that described above where addresses are exchanged between child and parent and a wireless communication session is initiated between the two.

After the child has associated with the new parent, the child device determines whether the new parent is suitable as a permanent parent (step 1224). If the new parent is the restored previous parent, then the new parent will likely be sufficient as a permanent parent. Also, if the new parent was on a list of backup parents for the child that may be used as a permanent parent, then the child device may decide that the new parent is suitable as a permanent parent. However, if the new parent is at or near capacity (i.e., child capacity), then the new parent may only be suitable as a temporary parent until the failed router 120 is restored.

If the new parent is suitable as a permanent parent for the child device, then the method may end and the association between the child and parent may be maintained indefinitely (step 1256). On the other hand, if the new parent is not suitable as a permanent parent, then the child device will continue searching for its previous parent even while it is associated with the new parent (step 1228). The child device may search periodically or continuously for the previous parent. In one embodiment, the child device searches for the previous parent device periodically in order to limit energy consumption. As a part of searching for the previous parent, the child device scans for RF activity and if such activity is detected, determines if the activity is originating from the previous parent by asking for the address of the active RF device (step 1232). If the previous parent is not found, then the child node will continue searching for the previous parent even while associated with the temporary parent.

If the previous parent is found by the child node, then the child node will re-associate with the previous parent (i.e., the failed router 120) (step 1236). Along with re-associating with the previous parent, the child node will break its association with the temporary parent device.

To have the wireless network 104 become completely restored, the previous parent still has to re-associate with its previous parent. To begin this process, the previous parent of the failed router 120 is opened for discovery (step 1240). The command to open the previous parent of the failed router 120 may be received from the central server 138 or from the property management system 216.

After the parent of the previously failed router 120 has been opened for discovery, the router 120 will begin searching for the previous parent (step 1244). Once the previous parent is located, the router 120 will re-associate with its previous parent (step 1248). During the re-association, the router 120 may be required to retransmit its address to the central server 138. In an alternative embodiment, the parent of the failed router 120 and/or the central server 138 may maintain the identification information for the failed router 120 and the failed router 120 only has to transmit a signal indicating that it has been restored and has re-associated with its previous parent. Upon receipt of the signal the central server 138 and/or parent of the failed router 120 may update their memory to indicate that the re-association without receiving the actual address of the failed router 120.

Once the failed router 120 has been re-associated with its previous parent, the parent as well as the failed router 120 is closed to discovery by other devices, thereby preserving the current connections in the wireless network 104 (step 1252). After the devices have been closed to discovery, the method ends (step 1256).

Figure 13:
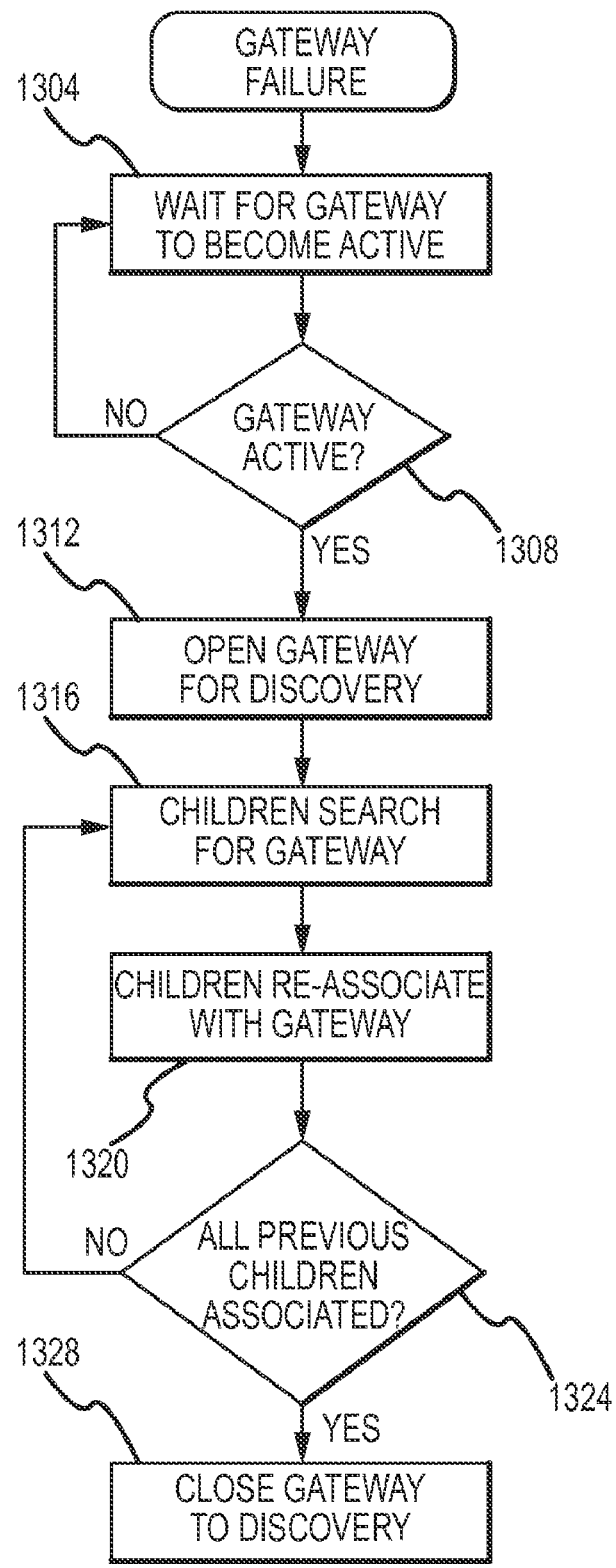
FIG. 13 is a flow diagram depicting aspects of a method for recovering from a gateway failure in accordance with embodiments of the present invention.

FIG. 13 depicts a method of recovering from a gateway 116 failure in accordance with at least some embodiments of the present invention. A gateway 116 usually serves as a connector for a number of devices in the wireless network 104 to the wired network 108. The gateways 116 may be operated at or near capacity thereby exploiting their full potential as connectors between the different networks. Accordingly, when a gateway 116 fails, it is often the case that no other alternative gateways 116 are available to connect the portion of the wireless network 104 served by the failed gateway 116 to the wired network 108. Therefore, when a gateway 116 fails, most of the devices in the wireless network 104 have to wait for the gateway 116 to become active again (step 1304). The failed gateway 116 may be restored either by fixing or replacing the gateway 116. In one embodiment, the wireless devices will continue to wait until the failed gateway 116 is restored (step 1308). While waiting, some wireless devices may continue to store data that would otherwise be transmitted to the central server 138 if the gateway 116 were operational.

Once the gateway 116 becomes operational again, the gateway 116 is opened for discovery (step 1312). More specifically, the gateway 116 may be opened for child discovery. When the gateway 116 is opened for discovery, the children will search for and ultimately find the restored gateway 116 (step 1316). The restored gateway 116 may then begin re-associating with its children nodes (step 1320).

In accordance with one embodiment, the gateway 116 may be limited in the number of child nodes it can associate with at the same time. In the event that the gateway 116 is limited in the number of child nodes it is allowed to associate with at the same time, due to processing restrictions or the like, the gateway 116 may be given a list by the central server 138 indicating the order in which it should associate with its children nodes. The central server 138 may maintain the list of which children nodes are associated with which parent nodes and when a gateway 116 fails, the central server 138 may dictate the order in which re-association occurs. The order may be ordered according to node importance or may be completely arbitrary. Once the first child node has successfully re-associated with the gateway 116, the next child node in the defined order may begin re-association.

In accordance with alternative embodiments, the gateway 116 may not be limited in the number of children that it can associate with at once, or may only need to associate with a number of children that does not exceeds its threshold, in which case the gateway 116 will re-associate will all of the children nodes at substantially the same time. In step 1324, it is determined if the gateway 116 has re-associated with all of its previous children nodes. This determination may be made by comparing a list of currently associated children nodes with a list of previously associated children nodes. If the two lists match, then it can affirmatively be determined that all children nodes have successfully re-associated with the gateway 116. If there is some children nodes that have not re-associated with the gateway 116, then the method may return to step 1316. Alternatively, it may be determined if those children nodes not associated with the gateway 116 have found alternative parents to become permanently associated with. If this is the case, or if all of the children nodes have re-associated with the gateway 116, then the gateway 116 is closed to discovery because the wireless network 104 has been restored (step 1328).

Figure 14:
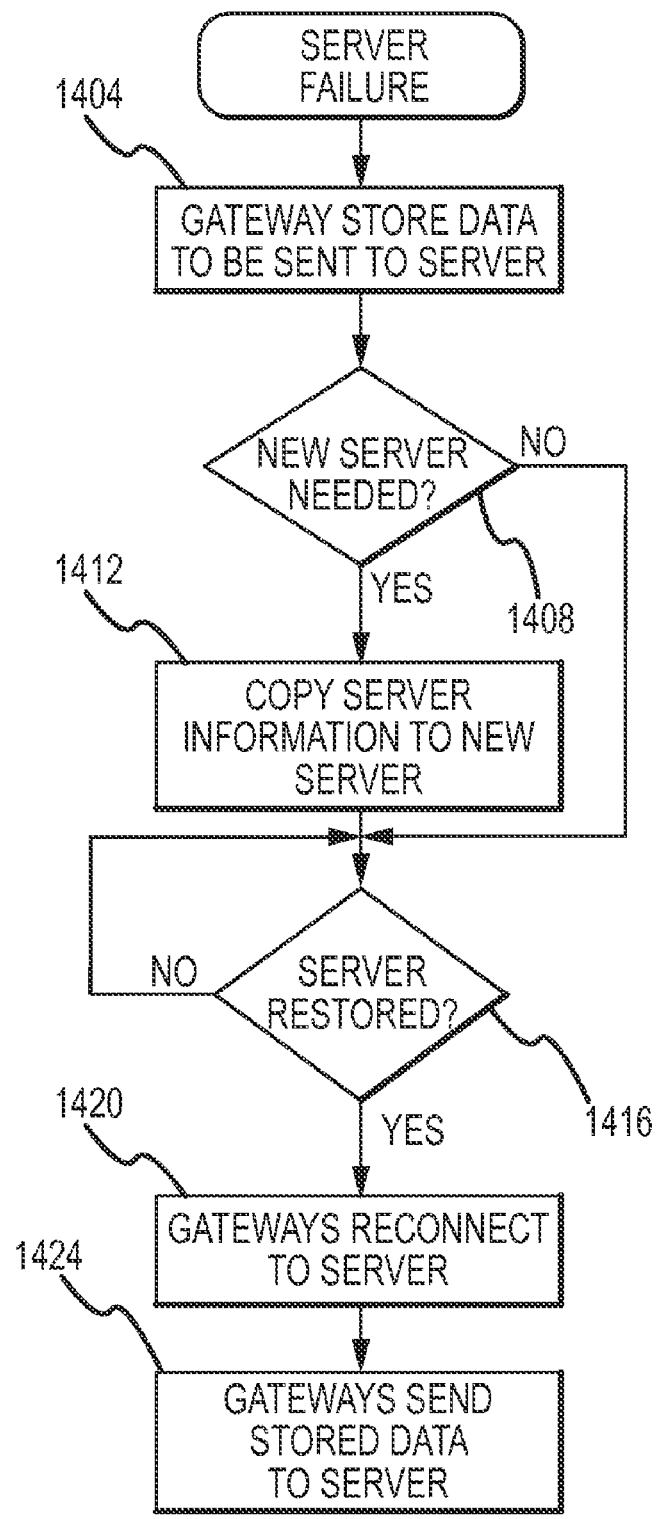
FIG. 14 is a flow diagram depicting aspects of a method for recovering from a server failure in accordance with embodiments of the present invention.

FIG. 14 depicts a method of recovering from a server 138 failure in accordance with at least some embodiments of the present invention. The central server 138 is a common point where data from the wireless 104 and wired 108 networks converge. There exists the possibility that the central server 138 may fail. In some embodiments, redundant servers may be provided such that no effect is felt due to having one server fail. However, in some embodiments, the failure of the central server 138 may require the network to compensate until the central server 138 can be restored. In the event that the central server 138 does fail and no alternatives are available to immediately replace the central server 138, then the gateways 116 will store data received from the children that would otherwise be transmitted to the central server 138 (step 1404). While the gateways 116 are storing data from their children, it is determined whether a new server will be required (i.e., whether the server failure is catastrophic and will require the server to be replaced) (step 1408). In the event that a new server is needed, then the data that was stored on the previous server is copied to the new server (step 1412). Of course, this particular step of may be performed during operation where the primary server mirrors data to a backup server so that the backup server can assume primary server responsibilities almost instantaneously when the primary server fails. Alternatively, the data from the server may be retrieved either from the memory of the server or from the database 140 and copied to the new server.

After the data has been copied to the new server, or in the event that a new server is unnecessary, it is determined whether either the original server or the backup server has been restored and is currently active (step 1416). When the server is restored, the gateways 116 reconnect to the server via the wired network 108 (step 1420). After the connection is re-established, the gateways 116 transfer the data that has been stored while the server was being restored (step 1424). This allows the data logs to be maintained accurately in the central server 138 memory and database 140, thereby allowing the property management system 216 to properly manage the property because accurate information is being received.

Figure 15:
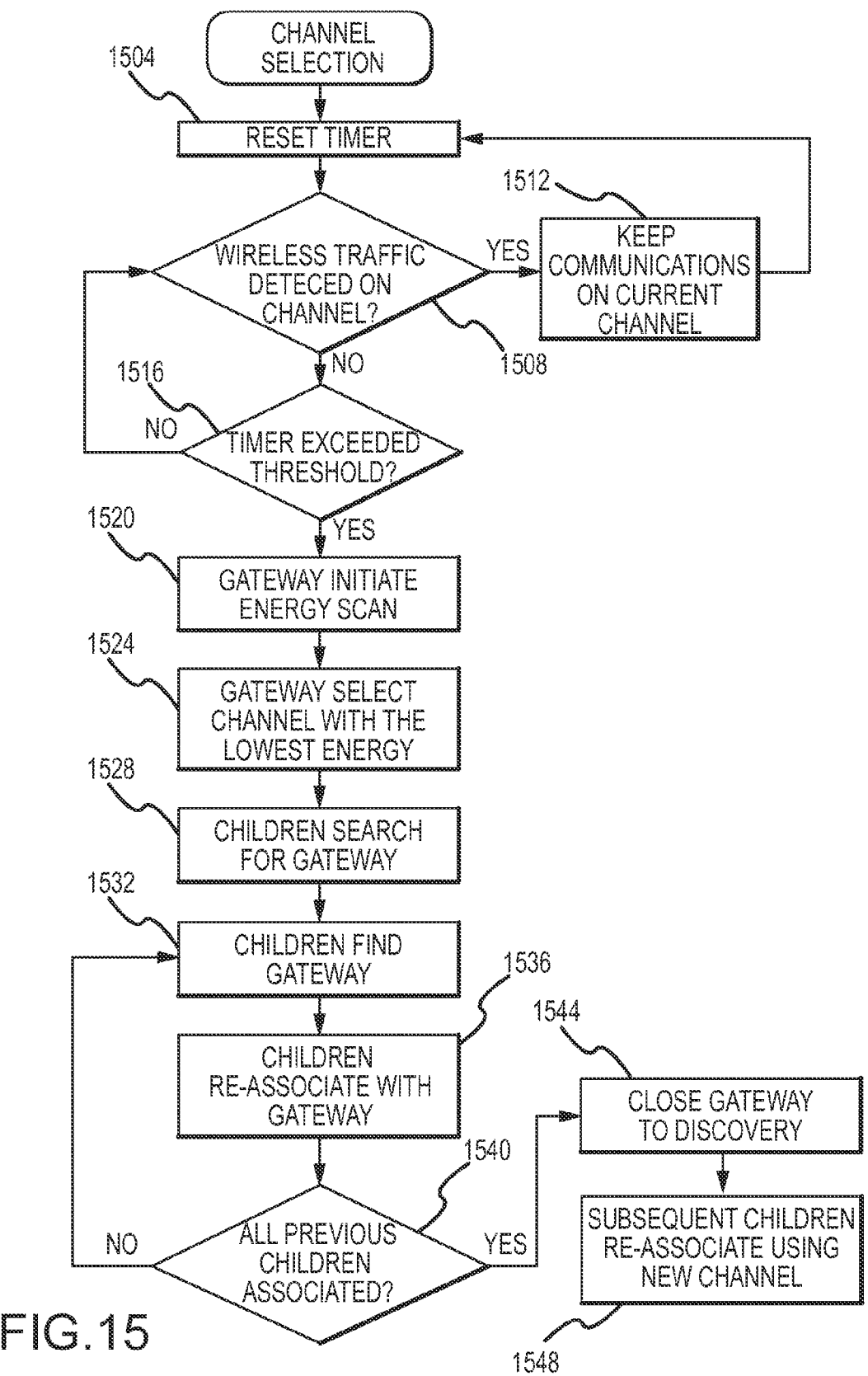
FIG. 15 is a flow diagram depicting aspects of a method for selecting a wireless communication channel in accordance with embodiments of the present invention.

With reference now to FIG. 15, a method of selecting a wireless channel within a given frequency bandwidth for a wireless device will be described in accordance with at least some embodiments of the present invention. The method begins by resetting a timer, typically located in the central server 138, but which also may be maintained in the wireless device (e.g., gateway 116, router 120, or end device 124) (step 1504). With the timer reset, the subject wireless device determines whether there is wireless traffic detected on a selected channel (step 1508). In determining whether there is wireless traffic on the selected channel, the wireless device may query its children and parent devices or check the activity of its children and parent devices to ensure communications are occurring properly. Also, the wireless device may check to see if messages are being lost between its parent and/or children nodes, and if so it may determine that wireless traffic is not occurring properly on the selected channel. If the wireless activity is detected and determined to be adequate on the selected channel, then the communications are maintained on the current channel (step 1512), and the timer is reset (step 1504).

However, if the wireless activity is not detected or determined to be inadequate (e.g., because messages are being lost), then it is determined if the timer has exceeded a predetermined threshold (step 1516). The value of the threshold may be based on the required accuracy of transmitted data and may range from a few seconds to a couple of minutes. If the timer has not exceeded the threshold, then the method returns to step 1508. When it is determined that the timer has exceeded the threshold, the wireless gateway 116 initiates an energy scan (step 1520). The purpose of the energy scan is for the gateway 116 to identify a channel with a relatively minimal amount of traffic on it. For example, the gateway 116 will have a number of wireless devices associated with it try to identify the channel with the least amount of noise on the channel.

After scanning the various channels, the gateway 116 selects the channel with the lowest amount of RF energy or noise on it (step 1524). The gateway 116 can make this decision based on the RF activity within proximity to the gateway 116, but may also make the decision based on the RF activity around routers 120 or end devices 124 associated with the gateway 116. Once the gateway 116 has made a decision regarding what channel the wireless network 104 will use, the gateway 116 switches to the selected channel and the children of the gateway begin searching for the gateway 116 on different channels (step 1528). Eventually the children nodes will find the gateway 116 on the new channel (step 1532). In one embodiment, the children nodes will search all of the channels at random until the gateway 116 is found. In an alternative embodiment, the gateway 116 will send a message to each child node indicating what channel the gateway 116 will switch to. This allows each child node to automatically switch to the same channel as the gateway 116.

Once the children nodes have found the gateway 116, the children nodes re-associate with the gateway 116 (step 1536). Then it is determined whether all of the previous children have re-associated with the gateway 116 (step 1540). In determining whether all of the children have re-associated with the gateway 116, a list of previously associated children may be compared with a list of the children currently associated with the gateway 116. If all of the previous children have not re-associated with the gateway 116, then the method returns to step 1532.

When all of the children nodes have re-associated with the gateway 116, the gateway 116 is closed to discovery and no other children nodes are allowed to connect with the gateway 116 and the communication channels for the gateway 116 are fixed (step 1544). After the children of the gateway 116 have associated with the gateway 116 on the new channel, the subsequent children (i.e., the children of the children of the gateway 116) re-associate with their parents on the new channel (step 1548).

In accordance with other embodiments, the gateway 116 may not need to switch channels because there is not much noise near it. Rather, the gateway 116 may cause only a portion of the wireless network 104 to switch channels. In this particular embodiment, the gateway 116 may cause one or more of its children or children of its children to switch channels without actually switching channels itself. In this way, the wireless network 104 may be operating on two or more channels. This means that some wireless devices may receive data on one channel and transmit data on another channel.

Figure 16:
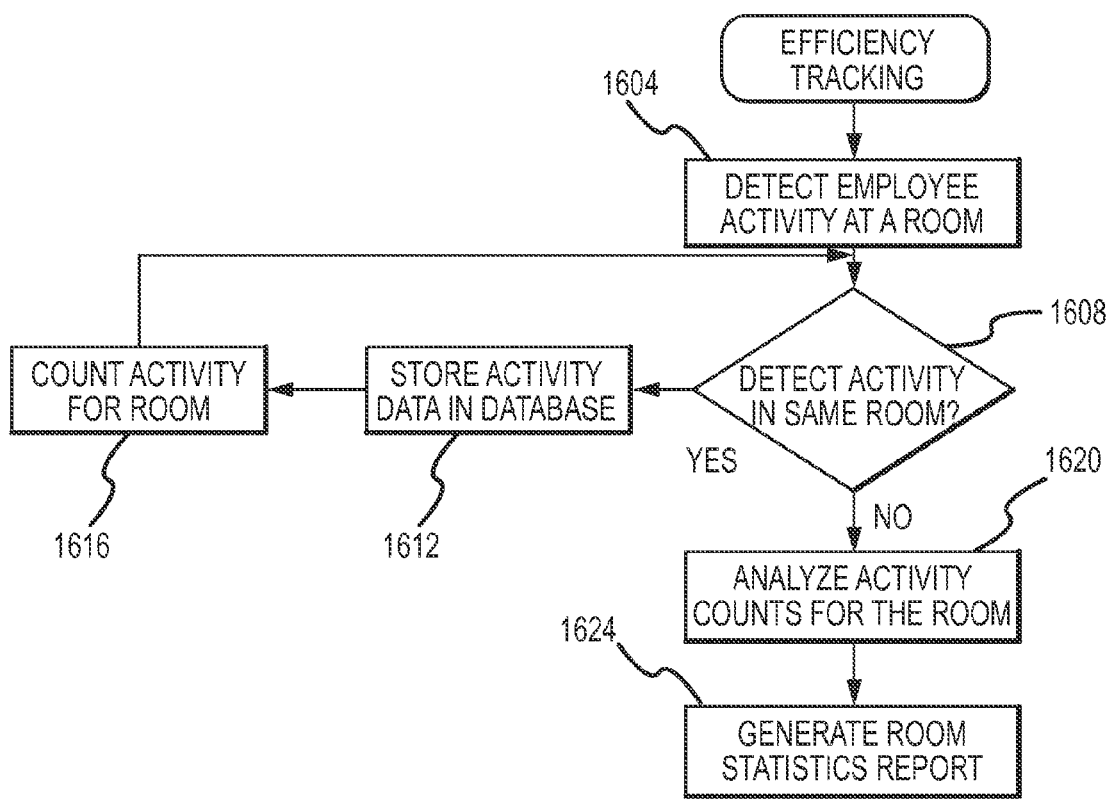
FIG. 16 is a flow diagram depicting aspects of a method for tracking employee efficiency in accordance with embodiments of the present invention.

FIG. 16 depicts a method of tracking the efficiency of personnel in a multi-room facility. One advantage of employing a wireless network 104 in a multi-room facility is that data may be transmitted in near real-time to the central server 138 and therefore the property management system 216. The method begins when the activity of an employee is detected at a room (step 1604). After activity has been detected in a room for an employee, the method waits to until more activity is detected in the same room (step 1608). The kinds of activity that may be detected in a room may include the employee entering the room, leaving the room, turning on a light, opening a door, room is cleaned and ready for a new guest, notification of an issue in the room, or any other activity that can be detected in a room. If more than one activity is detected in the same room for the same employee, then the activity data is stored in the database 140 (step 1612). Then the activity is counted for the employee for that room (step 1616). This continues as long as activity is detected in the same room for the same employee. In the event that activity is detected for the employee in a different room, then the activity counts for the previous room are counted for that employee (step 1620).

As a part of analyzing the activity counts for that employee in the given room, the time difference between various activities is calculated and compared to the time that such activities should take. For example, if cleaning a room should take around 1 hour, and the activity of the employee in the room reflects that the room was cleaned in 1 hour, then the analysis of the room activity for that employee will reflect that the room was cleaned in the required time. However, if the employee takes too long to clean the room, then the analysis will reflect that the employee took too long in cleaning the room. The data can then be compared to historical data for that same employee to identify working habits and other patterns for the employee. After the data is analyzed, then the room statistics can be aggregated into a room statistics report for the employee (step 1624).

Figure 17:
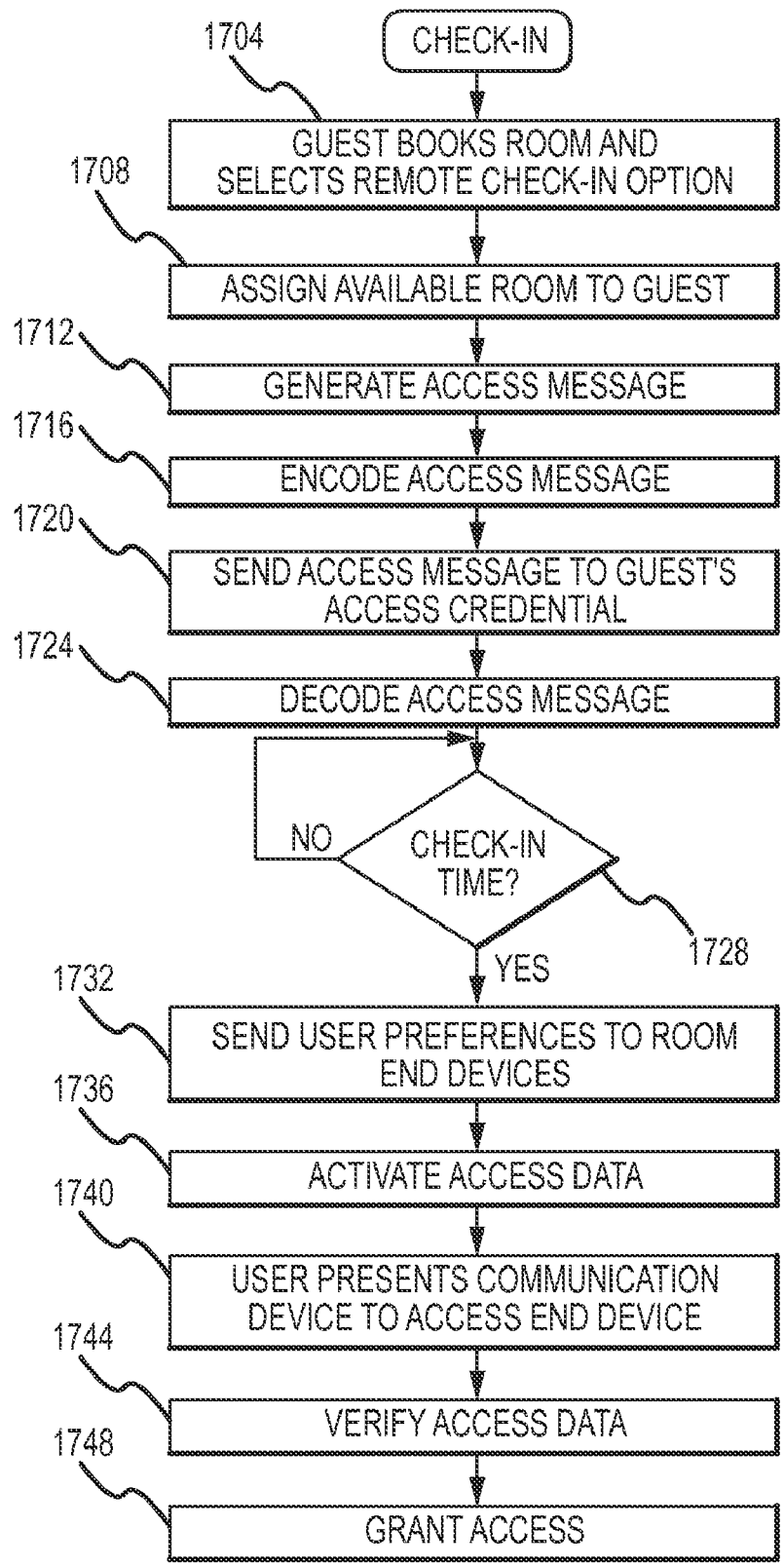
FIG. 17 is a flow diagram depicting aspects of a method for checking-in to a room in a multi-room facility in accordance with embodiments of the present invention.

Referring now to FIG. 17, a method of checking in to a room remotely will be described in accordance with at least some embodiments of the present invention. The method begins when a guest to a multi-room facility books a room and selects a remote check-in option (step 1704). By selecting the remote check-in option the guest has opted to have their check-in be performed automatically, rather than having to go to a concierge or the like to check-in before they go to their room. When the guest selects the remote check-in option, the guest is assigned a room that is projected to be available during their stay (step 1708). This requires the pre-allocation of rooms to some guests, such that those particular rooms are not assigned to another guest. Of course, the room assignments may change, but initially the guest is assigned a room.

After a room has been assigned to the guest, an access message is generated at the central server 138 or property management system 216 (step 1712). The access message may contain data related to the room that has been assigned to the guest as well as access permissions to that room. The message may be generated and maintained in source code (i.e., binary data) or it may contain a user friendly portion that can be perceived by the user, the user friendly portion can tell the guest what room they have been assigned to as well as when they will be allowed access to the room. The access message may also contain a self-timing mechanism that determines when the access permissions to the room are activated and de-activated based on the allowed time of permission for the guest.

Once the access message has been generated, the access message is encoded for secure transmission to the guest's communication device 236 (step 1716). Upon encoding the message, the central server causes the message to be transmitted to the guest's communication device 236, which is typically in the form of an access credential 204 (step 1720). In accordance with embodiments of the present invention, the guest's communication device 236 may comprise an NFC enabled communication device that allows the communication device 236 to receive the access message as well as support access control applications. For example, the communication device 236 may comprise an NFC enabled cellular phone or the like that can receive an SMS message, a cellular phone call, a page, or any other type of data transmission across the communication network 232. The cellular phone may also be equipped to communicate the access message to the access end device 124 thereby allowing the access end device 124 to make an access control decision for the guest's communication device 236.

Upon receiving the message, the communication device 236 decodes the access message back to its original format (step 1724). After decoding, the communication device 236 may separate the access message into its different portions (e.g., message and access permissions) and treat each portion appropriately. For instance, the access permissions may be stored in memory of the communication device 236 for future use whereas the message may be displayed to the guest upon receipt so that the guest knows that the reservation has been confirmed. Thereafter, it is determined if it is time for check-in (step 1728). The self-timing mechanism may be referenced to determine if it is time to allow the guest to check-in to their room. The check-in time is controlled so that various maintenance steps can be taken before the guest enters the room. If it is not time to allow check-in, then the access permissions remain unusable and the self-timing mechanism is further monitored.

Once it is allowable for the guest to check-in to their room, the access end devices 124 in the appropriate rooms may have user preferences and access permissions transmitted to them (step 1732). Upon receiving the access permissions for the new guest, the access end device 124 may know that it can allow access to the guest, whereas before receiving the user preferences and access permissions, the access end device 124 would not have allowed access to the room. In an alternative embodiment, the access control decisions may be made by the central server 138 and therefore the need to transmit data to the access end device 124 may be unnecessary. In other words, when the access end device 124 receives access data from an access credential 204 and/or communication device 236, it may simply forward such data to the central server 138 and wait for a decision from the central server 138 regarding whether the device presented to the access end device 124 is allowed access. However, given the nature of the wireless network 104 it may be preferable to make the access decisions at the access end device 124 and not require transmission of data across the wireless network 104. In addition to sending user preferences to the appropriate access end device 124, the user preferences may be transmitted to various other end devices 124 in the room, such that the guest can enter the room and have it at their desired temperature, and other user configurable settings.

Along with activating the access end device 124 in the room, the access permissions may be activated on the communication device 236 (step 1736). Of course, the access permissions may not need to be activated in the communication device 236, but activation of the permissions may provide an additional layer of security for the system 100.

Once the access end device 124 has received the access permissions for the guest and/or the access permissions for the guest have been activated on the communication device 236 the user may present the communication device 236 to the access end device 124 (step 1740). Upon presenting the communication device 236 to the access end device 124, the access permissions data may be analyzed either by the access end device 124 or by the central server 138 and an access decision may be made (step 1744). If the access data is verified and it is determined that the guest is allowed to obtain access to the room, then the guest is granted access to the room (step 1748). This particular step may comprise the access end device 124 deactivating a lock on the room or the like, thereby allowing the guest to enter the room.

One advantage of using the remote check-in option is that the guest only has to book the room and the check-in is performed automatically. In other words, the guest does not have to visit facility personnel before they go to their room. Instead, the guest can arrive at the facility and go directly to their room and if the time is appropriate such that the guest can enter the room, they are allowed access to the room. Additionally, the functions of the facility personnel are changed such that they do not have to check every guest in. More specifically, there is no need to check-in a guest that has utilized the remote check-in option. The remote check-in option is made possible by a communication device 236 that also functions as an access credential 204, where access permissions can be transmitted to the communication device 236 automatically across the communication network 232.

Figure 18:
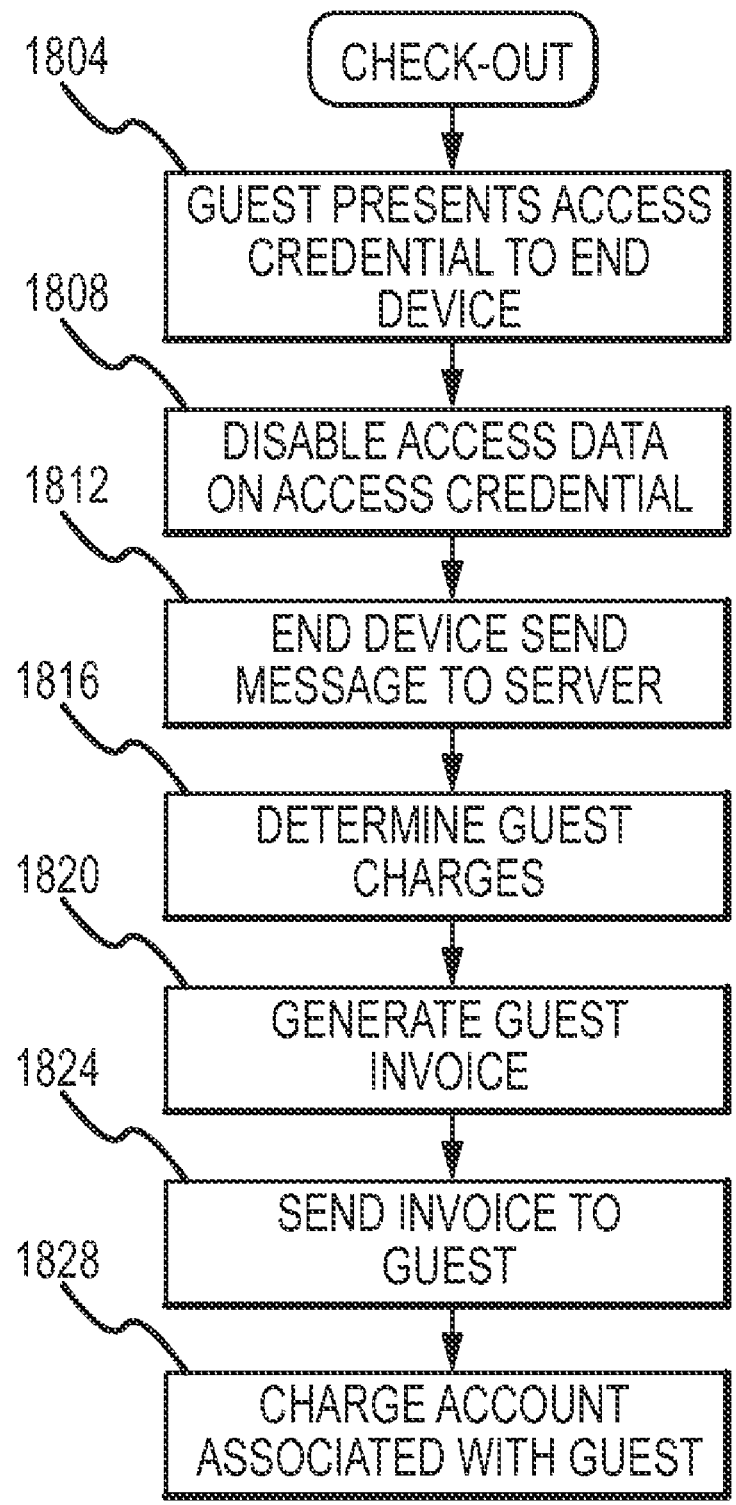
FIG. 18 is a flow diagram depicting aspects of a method for checking-out of a room in a multi-room facility in accordance with embodiments of the present invention.

FIG. 18 depicts a method of checking-out of a room in a multi-room facility in accordance with at least some embodiments of the present invention. To begin the check-out procedure, the guest presents an access credential 204 to an end device 124 (step 1804). The end device 124 may be located in the guest's room or may be located in a central location. In one embodiment, the guest presents their access credential 204 to a television end device 124. In an alternative embodiment, the guest presents their access credential 204 to a designated check-out end device 124.

Upon presenting the access credential 204 to the end device 124, the access data on the access credential 204 is disabled (step 1808). The access data may be disabled by partially or completely deleting the access data from the memory of the access credential 204. Alternatively, the access end devices 124 may have their access data permissions updated to reflect that the access credential 204 should not be allowed access.

After the access data has been disabled, the end device 124 may send a message to the central server 138 indicating that the guest is checking-out (step 1812). When the central server 138 receives the message, the central server 138 may determine what charges the user has incurred during their stay (step 1816). The charges may have been automatically updated during the guest's stay. For example, if the guest took a beverage from the mini-bar, then the mini-bar end device 124 may have detected such activity and automatically charged the guest's account. Once the guest's charges have been determined, an invoice is generated for the guest (step 1820). The invoice is then sent to the guest either directly to the guest's communication device 236 or to another predetermined location (step 1824). Upon sending an invoice to the guest, the guest may have an account automatically charged to appropriate amount (step 1828). In one embodiment, the guest may have identified a financial account that can be automatically charged. In this embodiment, the identified financial account can be automatically charged and the guest can receive notification of the same within the invoice. Alternatively, the invoice may be sent to the guest and the guest can then present a form of payment to the end device 124 to complete the transaction. Once the guest has paid the required charges, the guest can be considered checked-out and the method ends.

Figure 19:
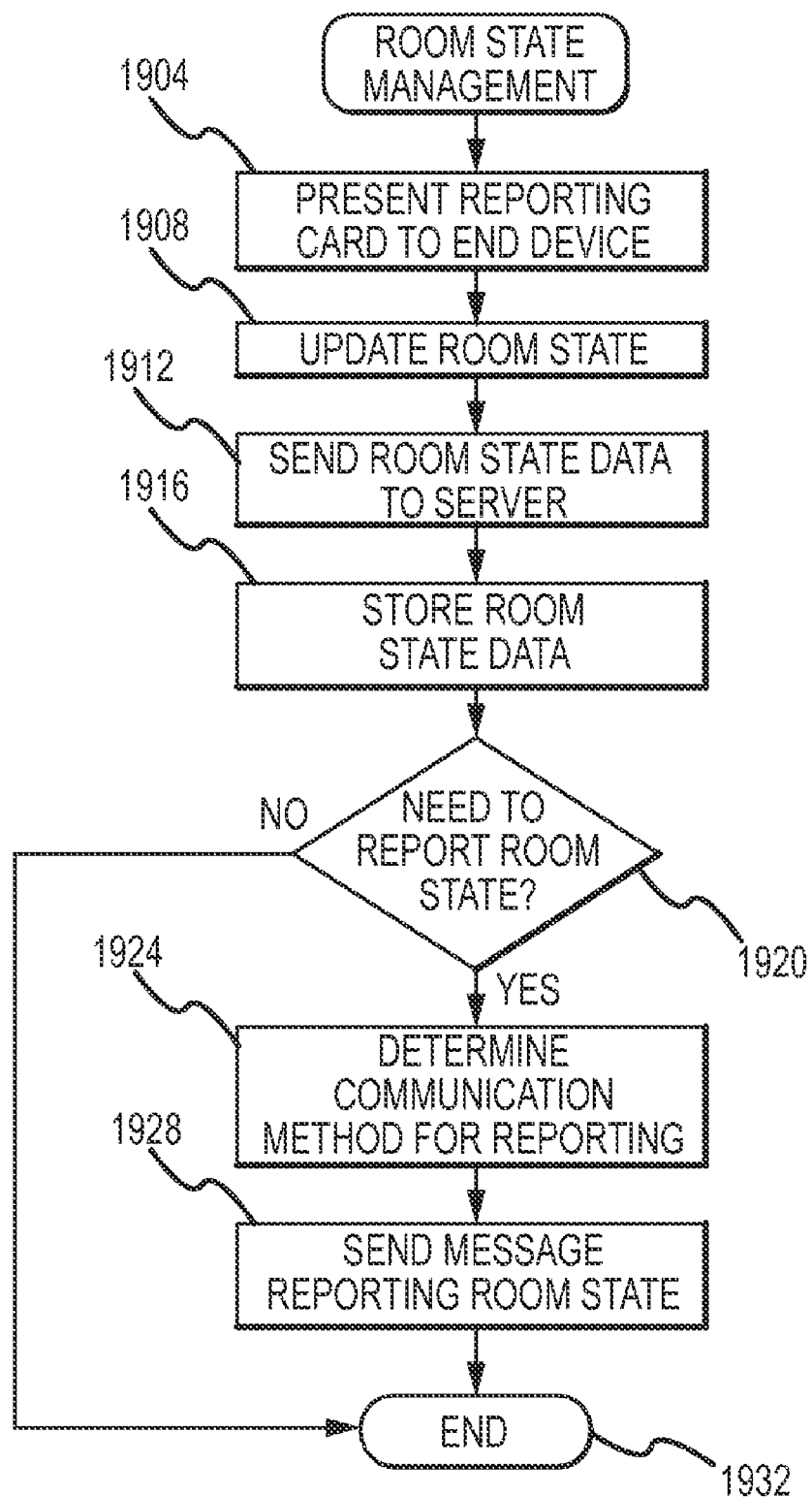
FIG. 19 is a flow diagram depicting aspects of a method for managing room state information in accordance with embodiments of the present invention.

FIG. 19 depicts a method of managing the state of a room in accordance with embodiments of the present invention. Initially, a reporting card 208 is presented to an end device 124 associated with a room (step 1904). The presentation of the reporting card 208 may represent a certain state of the room, for example, various problems associated with the room and/or other actions that may be associated with a given room. When the reporting card 208 is presented to the end device 124, the state of the room is updated to reflect the type of reporting card 208 that was presented thereto (step 1908). As an example, if the reporting card 208 presented to the end device 124 represented that the room has been serviced, then the room state data is sent to the central server 138 (step 1912). Thereafter, the room state along with the time that the room state was reported is stored in the database 140 and/or in memory of the central server 138 (step 1916). In some embodiments, the room state may not necessarily change, but the time that the room state is reported may still be stored indicating that the room state of the room has been verified at a particular time.

When the central server 138 receives the room state data, the central server 138 will determine if it needs to report the room state to facility personnel (step 1920). This particular determination may be made automatically by the property management system 216 or manually by facility personnel managing the property management system 216. In the event that the room state does need to be reported to one or more facility personnel, the property management system 216 determines the communication method that should be employed to report the room state (step 1924). For instance, if the room state indicates that an electrician will be required to service the room, then the property management system 216 may determine how to contact the electrician (e.g., via pager, SMS message, email, etc.). Once it is determined how facility personnel should be contacted, the property management system 216 may request the appropriate server to send a message to the personnel via the communication network 232 (step 1928). Once the message has been sent, if reporting was required, or if not reporting was required, then the method ends (step 1932). This method may be repeated when the room is serviced by the facility personnel, the problem has been addressed, and the room state should be updated again.

Figure 20:
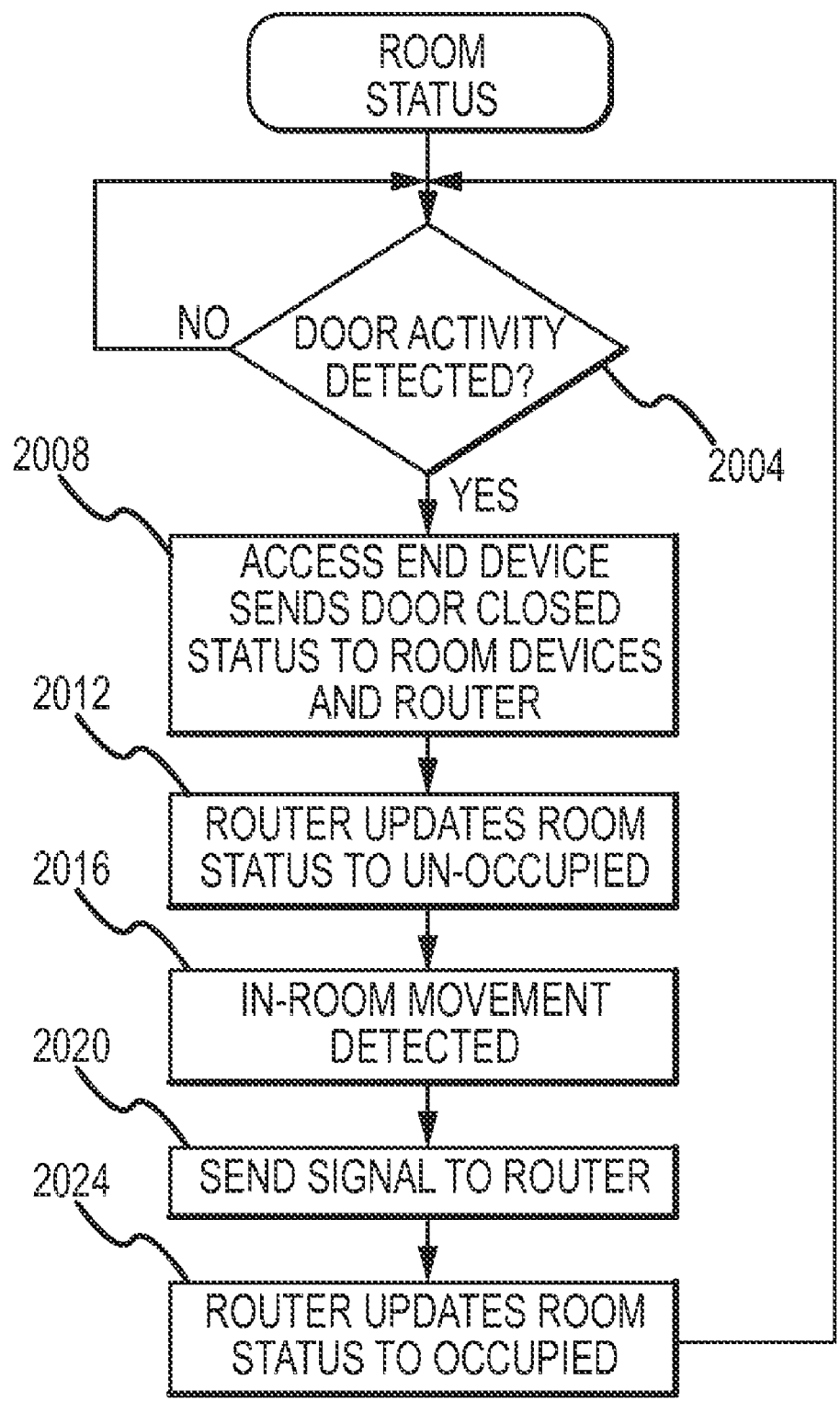
FIG. 20 is a flow diagram depicting aspects of a method for determining a state of a room in accordance with embodiments of the present invention.

Referring now to FIG. 20, a method of determining room status based on activity detected by end devices 124 will be described in accordance with at least some embodiments of the present invention. Initially, it is determined if door activity is detected (step 2004). Door activity may be detected either by an access end device 124 or by some other type of motion detecting end device 124. If no door activity is detected, then the method waits until such activity is detected. When door activity is detected, the access end device 124 sends a door closed status message to its parent device for ultimate transmission to the router 120 (step 2008). Upon receiving the door closed status message from the access end device 124, the router 120 will notify the central server 138 which in turn notifies other end devices 124 associated with the same room as the access end device 124 which sent the door closed message. In an alternative embodiment, the router 120 may send the door closed status message to the other room devices instead of sending it to the central server 138, unless the router 120 does not service all of the room devices. Also upon receiving the door closed status message, the router 120 servicing the access end device 124 updates the room status to un-occupied (step 2012). The updated room status may be transmitted to the central server 138 reflecting the same.

After the room status has been updated, the method waits until in-room movement is detected (step 2016). If no in-room movement is detected, then it can be assumed that the room status is un-occupied and therefore the room status does not need to be changed. However, if and when in-room movement is detected, for example, by a motion detector or an infrared detector, the sensor that detected the movement sends a signal to the router 120 indicating the same (step 2020). The message indicates that the door has been closed and a person is inside the room. Therefore, the router 120 servicing the room updates the room status to occupied and transmits the same message to other room devices and/or the central server 138 indicating the same (step 2024). Thereafter, the method returns to step 2004 to wait until more door activity is detected.

The management and determination of the room status can help to ensure that resources such as heat or air conditioning are used only when the room status is identified as occupied. In one embodiment, the control of various end devices 124 in the room will vary depending upon the room status. For example, if user preferences dictate, the curtains may be opened or closed and lights may be turned on automatically when the room status is identified as occupied. On the other hand, if the room status is identified as unoccupied, then the devices in the room may turn the lights off automatically, close the blinds, and turn off the air conditioning. The preservation of such resources in a multi-room facility can facilitate great cost savings, since a large portion of multi-room facility costs are attributed to energy usage.

Figure 21:
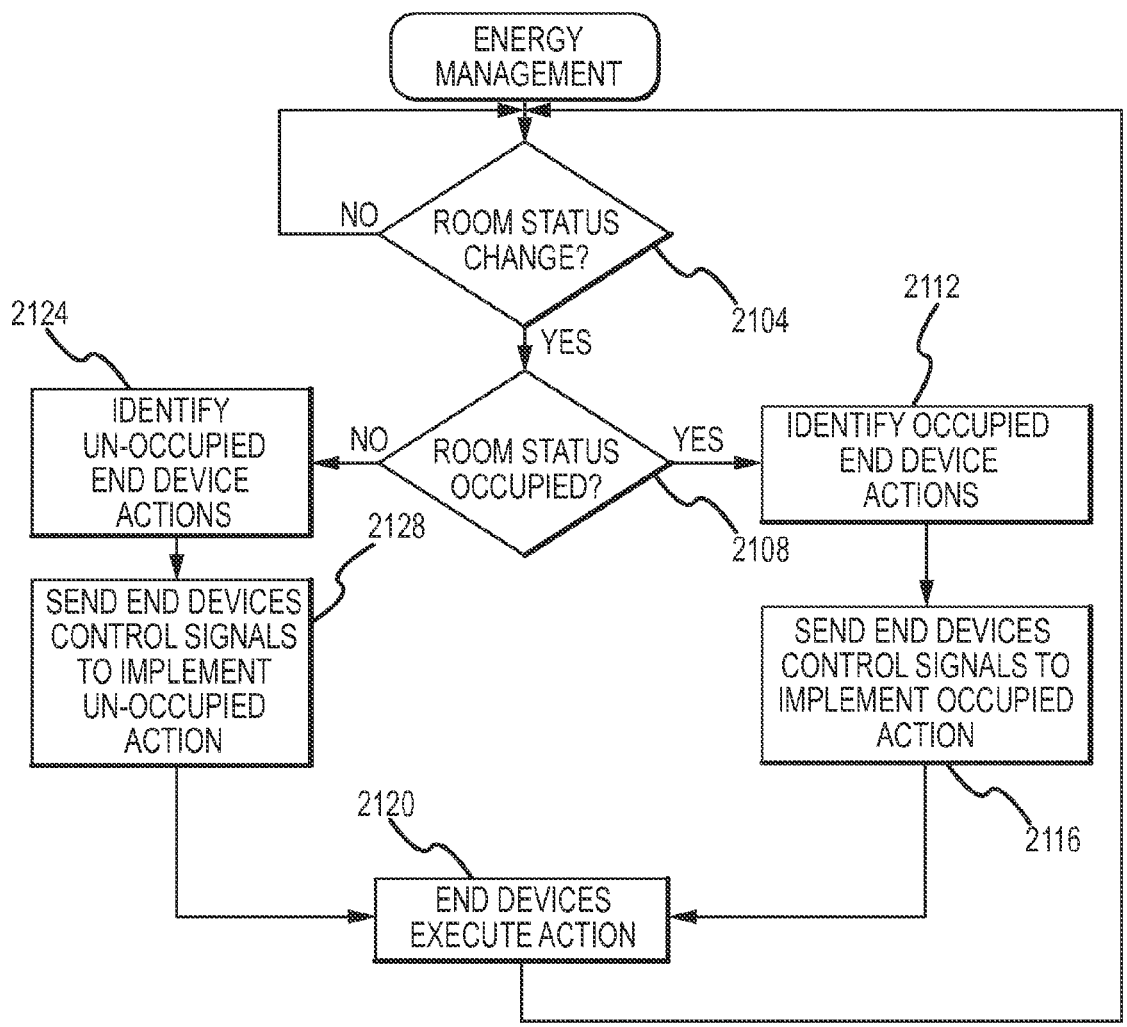
FIG. 21 is a flow diagram depicting aspects of a method for managing energy consumption in a room in accordance with embodiments of the present invention.

FIG. 21 depicts a method of managing energy resources in accordance with at least some embodiments of the present invention. The method begins by determining whether there is a change in the room status (step 2104). When there is no change in the room status, then the status quo of the room devices is preserved and no action is necessary. However, if the room status does change, it is determined whether the room status has changed to either occupied or un-occupied (step 2108). If the room status has changed to occupied from un-occupied, then the end device 124 actions associated with an occupied room are identified (step 2112). For example, if the lights are supposed to turn on, then the action associated with light end devices 124 will be to turn on. Additionally, if the user has certain room temperature preferences, then the thermostat end device 124 may have an action to cause the temperature to change to that temperature. When the end device actions are identified, a control signal is sent to each end device 124 requesting them to perform the identified action (step 2116). The signal may be generated by the router 120 serving the room. However, in a preferred embodiment, the property management system 216 and/or central server 138 generate such a message and send the message to the necessary end devices 124 in the wireless network 104.

When the end devices 124 receive the message to perform the action, the end devices 124 execute the necessary actions (step 2120). This causes the room system to adapt to the presence of a user in the room.

Referring back to step 2108, in the event that the room status changes from occupied to un-occupied, the opposite actions occur. Namely, the central server 138 and/or property management system 216 determine what type of actions should be performed by end devices 124 when the room status is un-occupied (step 2124). When the required actions are identified, a control signal is transmitted to the necessary end devices 124 in the room (step 2128). The un-occupied actions may correspond to energy saving actions such as turning off lights in the room, closing the blinds, turning off any HVAC operations, and so forth. Upon receiving the control signal, the end devices 124 react and execute the necessary actions to conform to the un-occupied room status (step 2120).

After the end devices 124 have performed the necessary actions, the method returns to step 2104 until the room status changes again. Otherwise, the status quo of the actions for the end devices 124 is maintained.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing a multi-room property having a plurality of end devices, comprising:
   opening a first parent wireless device to child discovery;
   causing a first of the plurality of end devices to associate with the first parent wireless device;
   causing a second of the plurality of end devices to associate with the first parent wireless device;
   opening a second parent wireless device to child discovery;
   causing the first parent wireless device to associate with the second parent wireless device;
   facilitating intermittent wireless communications of control messages from the first parent wireless device to at least one of the first and second end devices;
   facilitating intermittent wireless communications of status messages from at least one of the first and second end devices to the first parent wireless device;
   the first parent wireless device transferring one or more control messages received from the second parent wireless device to at least one of the first and second end devices; and
   limiting the wireless communications of control messages transmitted by the first parent wireless device to child wireless devices that associated themselves with the first parent wireless device during the first parent wireless device child discovery.

2. The method of claim 1, further comprising:
   the first parent wireless device transferring the status messages received from at least one of the first and second end devices to the second parent wireless device;
   limiting the wireless communications of control messages transmitted by the second parent wireless device to child wireless devices that associated themselves with the second parent wireless device during the second parent wireless device child discovery.

3. The method of claim 2, further comprising:
   monitoring the status messages transmitted from the first and second end devices; and
   analyzing the status messages transmitted from the first and second end devices to ensure that all of the status messages transmitted have been received by both the first parent wireless device and the second parent wireless device.

4. The method of claim 2, further comprising closing the second parent wireless device to child discovery.

5. The method of claim 2, further comprising closing the first parent wireless device to child discovery.

6. The method of claim 1, further comprising:
   determining that a first message was transmitted by the first end device and not received by a parent device which is associated with the first end device;
   sending a request for the first end device to retransmit the first message;
   the first end device retransmitting the first message;
   receiving the first message; and
   assembling the first message in order with other previously received messages.

7. The method of claim 1, further comprising:
   identifying that the first parent device has failed;
   causing the first and second end devices to begin searching for an alternative parent wireless device;
   the first and second end devices finding an alternative parent wireless device; and
   the first and second end devices associating with the alternative parent wireless device.

8. The method of claim 7, further comprising:
   determining that the alternative parent wireless device is sufficient as a permanent replacement to the first parent wireless device; and
   allowing the permanent association between the first and second end devices and the alternative parent wireless device.

9. The method of claim 7, further comprising:
   determining that the alternative parent wireless device is insufficient as a permanent replacement to the first parent wireless device;
   causing the first and second end devices to continue searching for activity of the first parent device;
   determining that the first parent device has been restored; and
   causing the first and second end devices to re-associate with the first parent device.

10. The method of claim 7, further comprising:
    determining the alternative parent wireless device is sufficient as a temporary replacement to the first parent wireless device;
    allowing temporary association between the first and second end devices and the alternative parent device;
    determining that the first parent device has been restored; and
    causing the first and second end devices to re-associate with the first parent device.

11. The method of claim 7, further comprising:
    storing all messages generated by the first and second end devices until an association with an alternative parent device is created; and,
    wirelessly transmitting the stored messages to the alternative parent device.

12. The method of claim 11, further comprising:
    assembling the stored messages in order with other previously received messages.

13. The method of claim 1, wherein the first parent device comprises one of a gateway and a router.

14. The method of claim 1, wherein the first end device is associated with a first room and the second end device is associated with a second different room.

15. The method of claim 1, wherein at least one of the first and second end device comprise at least one of a mini-bar end device, a safe end device, an access end device, a light switch end device, a door switch end device, a sensor end device, a thermostat end device.

16. The method of claim 1, wherein associating the first end device with the first parent wireless device comprises each device sharing their respective addresses such that a table of wireless network architecture can be generated based on child and parent addresses.

17. The method of claim 16, wherein the table of wireless network architecture is maintained in at least one of the first parent wireless device and a central server.

18. The method of claim 1, wherein the intermittent wireless communications between the first parent wireless device and the first and second end devices are conducted using a ZigBee communication protocol.

19. A method of managing a multi-room property having a plurality of end devices, comprising:
opening a first parent wireless device to child discovery;
causing a first of the plurality of end devices to associate with the first parent wireless device;
causing a second of the plurality of end devices to associate with the first parent wireless device;
closing the first parent wireless device to child discovery;
facilitating intermittent wireless communications of control messages from the first parent wireless device to at least one of the first and second end devices;
facilitating intermittent wireless communications of status messages from at least one of the first and second end devices to the first parent wireless device;
detecting activity at the first of the plurality of end devices, wherein the first of the plurality of end devices is associated with a first room;
generating a first message comprising information related to the detected activity;
wirelessly transmitting the first message from the first of the plurality of end devices to the first parent wireless device, wherein the first parent wireless device and first of the plurality of end devices are within a first common wireless transmission area;
the first parent wireless device wirelessly retransmitting the first message to a third wireless device, wherein the third wireless device is associated with a second room;
forwarding the first message from the third wireless device to a central server;
determining at least one action to be performed by the first of the plurality of end devices in response to the detected activity;
generating a second message comprising control information related to the determined at least one action;
transmitting the second message to the third wireless device;
the third wireless device wirelessly retransmitting the second message to the first parent wireless device;
the first parent wireless device wirelessly retransmitting the second message to the first of the plurality of end devices; and
the first of the plurality of end devices performing the at least one action.

* * * * *